United States Patent [19]

Okuno

[11] Patent Number: 5,612,760
[45] Date of Patent: Mar. 18, 1997

[54] CAMERA ADAPTED TO USE FILM CARTRIDGE HAVING LIGHT SHIELDING DOOR

[75] Inventor: Ryoji Okuno, Kanagawa-ken, Japan

[73] Assignee: Canon Kabushiki Kaisha, Tokyo, Japan

[21] Appl. No.: 364,793

[22] Filed: Dec. 27, 1994

[30] Foreign Application Priority Data

Dec. 28, 1993 [JP] Japan .................................. 5-337151

[51] Int. Cl.$^6$ .......................... G03B 17/02; G03B 17/26
[52] U.S. Cl. .................................... 396/513; 396/538
[58] Field of Search ........................... 354/21, 173.1, 354/174, 275, 288

[56] References Cited

U.S. PATENT DOCUMENTS 5,083,721  1/1992  Okutsu et al. ........................ 354/275
5,159,365  10/1992  Takahashi et al. .................... 354/21
5,307,099  4/1994  Kawamura et al. ................... 354/21
5,463,435  10/1995  Ezawa .................................... 354/21
5,526,084  6/1996  Kataoka et al. ....................... 354/275

*Primary Examiner*—A. A. Mathews
*Attorney, Agent, or Firm*—Robin, Blecker, Daley & Driscoll

[57] ABSTRACT

A camera, a unit or a unit adapted to the same arranged to be adapted to use an image recording medium cartridge having a cover for introducing/ejecting an image recording medium, the camera having a first unit for performing an operation of loading the cartridge into the camera or the unit and/or an operation of ejecting the cartridge from the camera or the unit, and a second unit for changing the operation of the first unit in accordance with a degree of a state where the cartridge can be used.

21 Claims, 21 Drawing Sheets

FIG.21
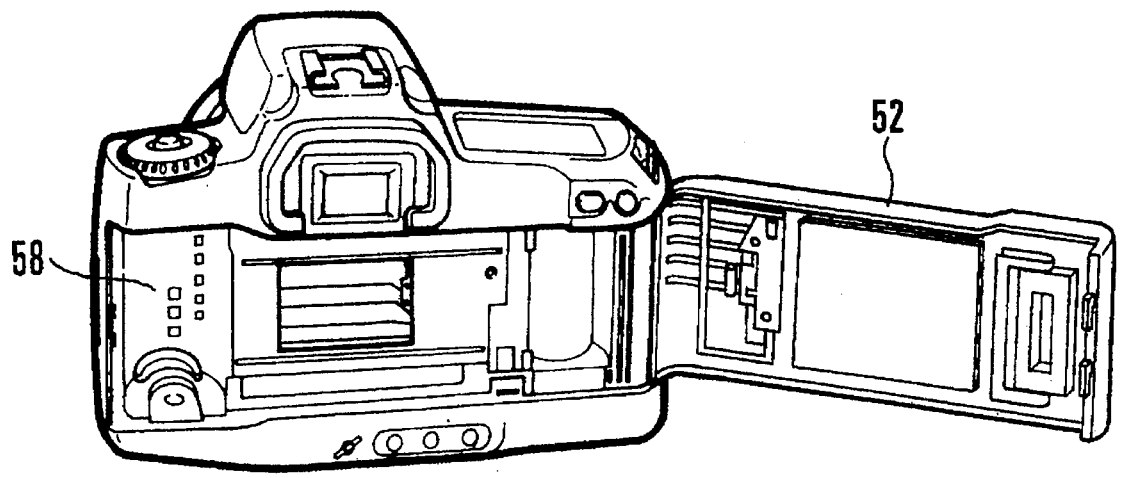
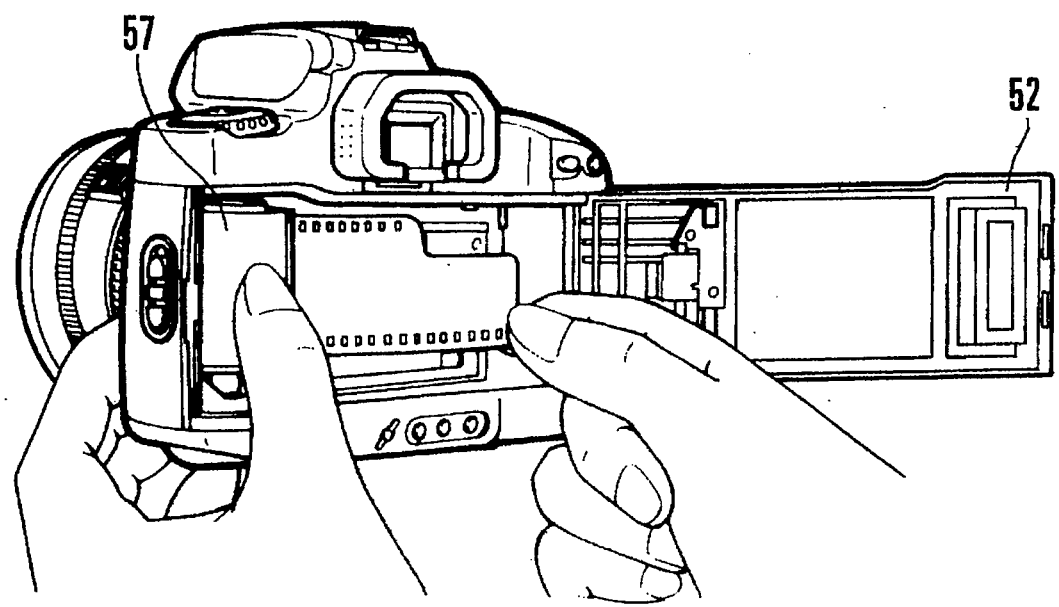

CAMERA ADAPTED TO USE FILM CARTRIDGE HAVING LIGHT SHIELDING DOOR

BACKGROUND OF THE INVENTION

1. Field of the Invention

The present invention relates to an improvement of a camera adapted to use a film cartridge having a moveable light shielding door.

2. Description of the Related Art

Hitherto, a film cartridge has been usually loaded into a camera by rearwards opening a rear cover 52, as shown in FIG. 21, so that a cartridge 57 is loaded into a cartridge chamber 58 that has appeared in the opened space. However, the foregoing method causes a variety of mechanisms in the camera to appear for a user of the camera through the opened space. Therefore, users inexperienced in cameras feel uneasy. Furthermore, methods of loading the cartridge subtly differ among cameras. As a result, the loading operation becomes too complicated or the user must over again hold the camera, thus resulting in the cartridge being loaded erroneously or the user of the camera being required to perform a complicated operation at the time of loading the cartridge.

On the other hand, a variety of cartridges has been suggested. A cartridge disclosed in Japanese Patent Laid-Open No. 3-75637 has a structure that the film is completely accommodated in the cartridge in the initial state and a film inlet/outlet door of the cartridge is opened at the time of feeding the film. Another structure disclosed in Japanese Patent Laid-Open No. 2-244848 has an arrangement that a film has a magnet input layer whereby a variety of information about photography can be written/read. A cartridge disclosed in Japanese Patent Laid-Open No. 4-37844 comprise, in an end surface thereof, a recess showing the state of use of the cartridge. A cartridge disclosed in Japanese Patent Laid-Open No. 4-233910 has an arrangement that information indicated by, for example, a bar code disposed on an end surface of the cartridge is optically detected so that the state of use of the cartridge is detected.

SUMMARY OF THE INVENTION

According to one aspect of the present invention, there is provided a camera, a unit or a unit adapted to the same arranged to use an image recording medium cartridge having a cover for introducing/ejecting an image recording medium, the camera comprising: first means for performing an operation of loading the cartridge into the camera or the unit and/or an operation of ejecting the cartridge from the camera or the unit; and second means for changing the operation of the first means in accordance with a degree of a state where said cartridge can be used so that an adequate operation with respect to the state whether or not the cartridge can be used is performed and loading of the cartridge into the camera or the apparatus and/or ejecting the cartridge from the same is performed easily.

Other aspects of the invention will be appear more fully from the following description.

BRIEF DESCRIPTION OF THE DRAWINGS

FIG. 21 is a diagram which illustrates a method of loading a cartridge into a conventional camera.

DETAILED DESCRIPTION OF THE PREFERRED EMBODIMENTS

Preferred embodiments of the present invention will now be described with reference to the drawings.

Figure 1:
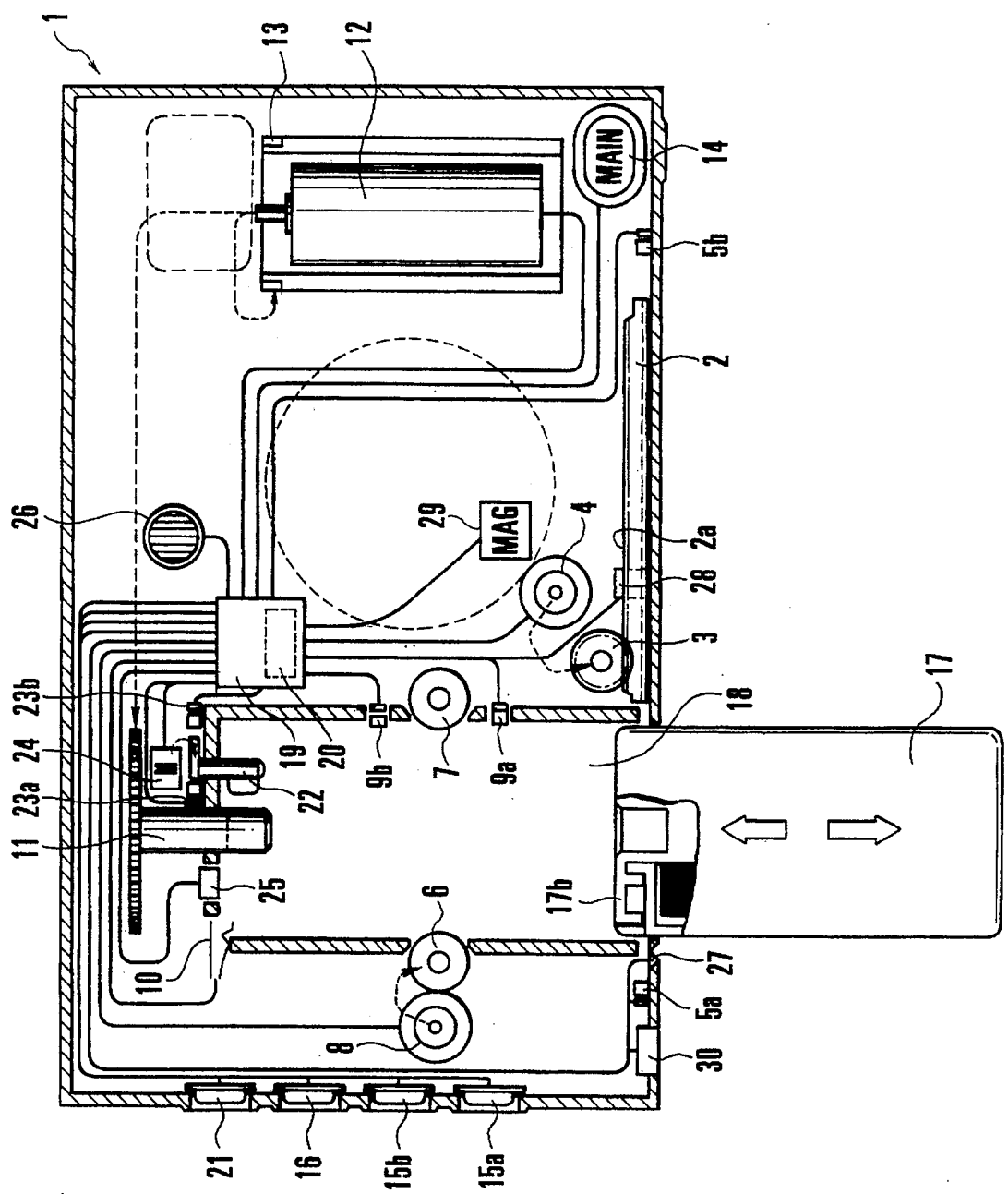
FIG. 1 is a cross sectional view which illustrates a camera according to a first embodiment of the present invention.

FIG. 1 is a cross sectional view which illustrates a camera according to a first embodiment of the present invention. Referring to FIG. 1, reference numeral 1 represents a camera body; 2 represents a cartridge chamber cover having a rack portion 2a and opening/closing a cartridge chamber 18; 3 represents a Gear train engaged to the rack portion 2a to transmit power to the cartridge chamber cover 2; 4 represents a motor for transmitting power to the cartridge chamber cover 2; 5a represents a switch for detecting completion of closing of the cartridge chamber cover 2; 5b represents a switch for detecting completion of opening of the cartridge chamber cover 2; 6 represents a gear having an elastic roller portion for conveying a cartridge 17; 7 represents a follower roller capable of freely rotating for conveying the cartridge 17, 8 represents a motor having a gear for transmitting power to the gear 6; 9a represents a switch for detecting start of introduction of the cartridge 17; 9b represents a switch for detecting completion of ejection of the cartridge 17; 10 represents a switch for detecting completion of loading of the cartridge 17; 11 represents a fork gear having a fork portion to be engaged to a spool in the cartridge 17 to move a film; 12 represents a motor for supplying power to a film feeding mechanism of the camera, the power of the motor 12 being distributed to the fork gear 11 and a spool gear 13 having a spool portion through a gear train (not shown); 14 represents a main switch; 15a represents a switch for opening the cartridge chamber cover 2; 15b represents a switch for closing the cartridge chamber cover 2; 16 represents a switch for forcibly rewinding the film; 17 represents the cartridge; 18 represents the cartridge chamber; 19 represents a microcomputer for controlling the operation of the camera; 20 represents a time control circuit included in the microcomputer 19; 21 represents a cartridge ejection switch; 22 represents a driver for opening/closing the door for light-shielding the film inlet/outlet of the cartridge 17; 23a and 23b represent switches for respectively detecting the positions of the driver 22 at which the same opens the door and at which the same closes the door; 24 represents a motor for operating the driver 22; 25 represents a photoreflector for optically reading information of a bar code displayed on an end surface of the cartridge 17 and indicating the ISO sensitivity, the number of frames of the film with which pictures can be taken, whether the film is a negative film or a positive film and the like; 26 represents an alarm buzzer; 27 represents a photosensor disposed on the outer surface of the camera adjacent to the inlet of the cartridge 17 and arranged to detect approach of the cartridge 17; 28 represents a photoreflector provided for the cartridge chamber cover 2 and arranged to detect the state, in which the film is used, and which is displayed on the end surface of the cartridge 17; 29 represents a magnetic head for writing/reading information to and from the film having a magnetic layer; and 30 represents an alarm lamp.

The cartridge 17 according to this embodiment, without exception, accommodates a film therein while shielding the film from light in an initial state where the film is not exposed to light, as disclosed in Japanese Patent Laid-Open No. 3-75637, the cartridge 17 having the magnetic layer to and from which information can be read/written. When the film is intended to be ejected from the cartridge 17, an operation portion arranged to act in synchronization with the film inlet/outlet light shielding door must be opened to open the film inlet/outlet light shielding door. In a case where a conventional cartridge of a type using a plush at the film inlet/outlet light shielding door for the purpose of shielding light is used, the driver 22, the driver position detection switches 23a and 23b and the driver operating motor 24, of course, are omitted.

Figure 20:
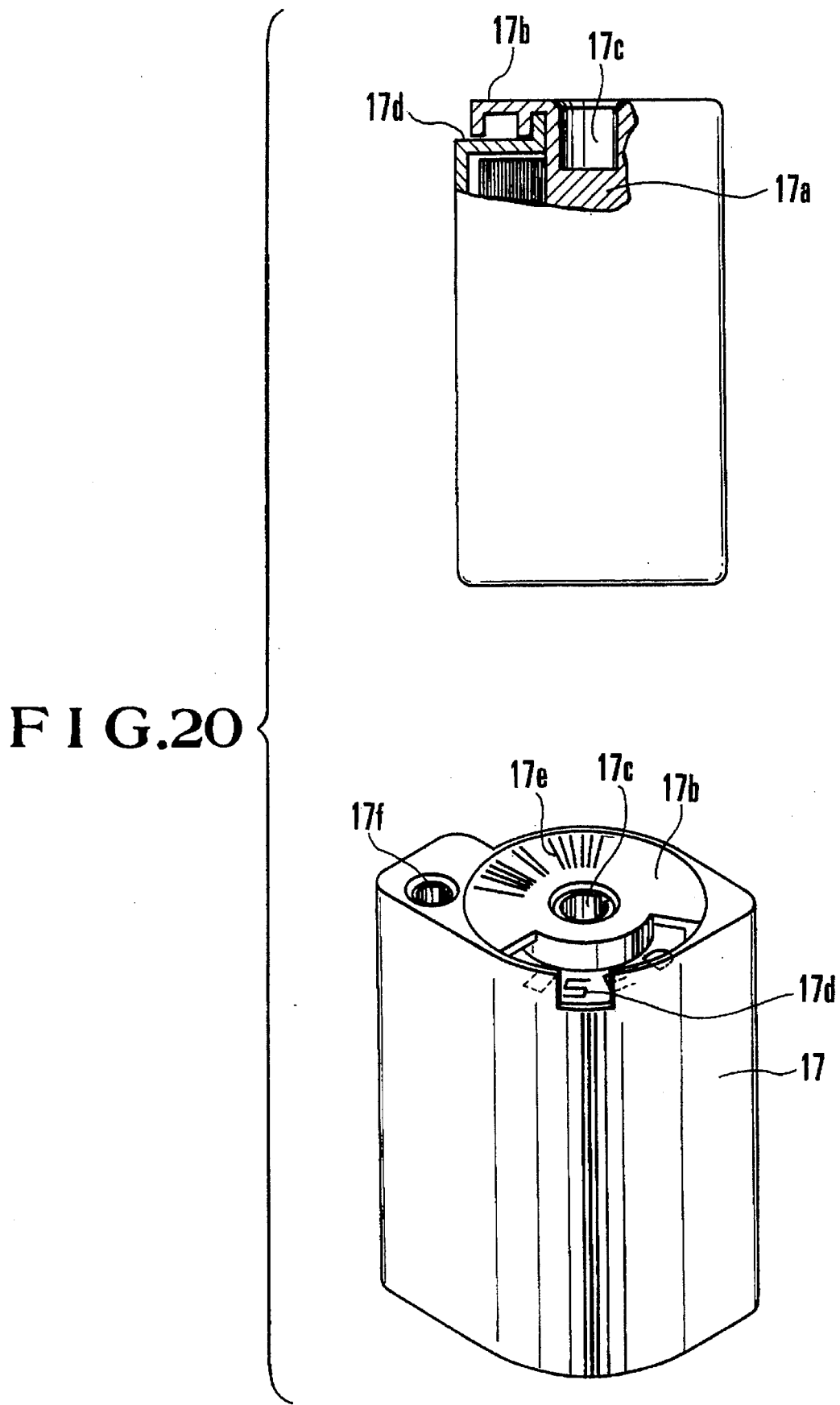
FIG. 20 is a diagram which illustrates the structure of a film cartridge for use in each embodiment.

The cartridge 17 according to this embodiment, as illustrated in detail in FIG. 20, comprises a flange portion 17b formed integrally with a film supply spool 17a therein, the position, at which the flange portion 17b is stopped, being changed between before and after use of the cartridge 17. The flange portion 17b has a cut portion in which an indication 17d appears to show information of the state of the cartridge 17 whether the cartridge 17 is not used, the same has been partially used or the same has been completely used. Furthermore, the performance of the cartridge 17, such as the ISO sensitivity, the number of frames of the film with which pictures can be taken, whether the film is a negative film or a positive film and the like, is indicated by the bar code 17e formed on the surface of the flange portion 17b. The cartridge 17 has, on the same surface thereof, an operation portion 17f for opening/closing the film inlet/outlet light shielding door and arranged to be engaged to the driver 22 of the camera and a spool operating drive engagement portion 17c arranged to be engaged to the fork portion of the fork gear 11 of the camera.

The main operation of this embodiment will now be described. Referring to FIG. 1, when the cartridge chamber cover 2 is opened in a state where the cartridge 17 has not been loaded into the cartridge chamber 18, the cartridge chamber cover opening switch 15a is depressed to transmit information of the depression to the microcomputer 19. The microcomputer 19 causes electric power to be supplied to the cartridge chamber cover operating motor 4 so as to move the cartridge chamber cover 2 from the closed position to the opened position through the gear train 3. The leading portion of the thus-opened cartridge chamber cover 2 depresses the opening completion detection switch 5b to transmit information of this depression to the microcomputer 19, thus stopping the rotation of the motor 4. Then, introduction of the cartridge 17 into the cartridge chamber 18 is, for a predetermined time, waited for. If the introduction of the cartridge 17 is not detected within the predetermined time, the motor 4 is again operated so that the cartridge chamber cover 2 is closed. If the cartridge 17 is introduced into the cartridge chamber 18 within the predetermined time after the cartridge chamber 18 is opened, the cartridge 17 depresses the cartridge introduction start detection switch 9a so that information of this depression is transmitted to the microcomputer 19.

Then, the cartridge conveying motor 8 starts introducing the cartridge 17 so that the roller 6 starts rotating. When the cartridge 17 has been introduced into the cartridge chamber 18, the side surfaces of the cartridge 17 are held by the rollers 6 and 7. The rotational force of the roller 6 introduces the cartridge 17 into the camera. The cartridge 17 is further introduced until an end of the spool in the cartridge 17 is completely engaged to the fork gear 11 and the portion for operating the cartridge film inlet/outlet light shielding door is completely engaged to the driver 22. Thus, an end surface of the cartridge 17 depresses the cartridge loading completion detection means 10 so as to transmit information of this depression to the microcomputer 19. As a result, rotation of the cartridge conveying motor 8 is stopped. At this time, the cartridge chamber cover 2 is closed automatically or by the cartridge chamber closing switch 15b. That is, the microcomputer 19 causes the motor 4 to receive electric power in a direction inversely to the foregoing operation so that the cartridge chamber cover 2 starts the closing operation. When the cartridge chamber cover 2 depresses the cartridge chamber closing completion position detection switch 5a, the microcomputer 19 stops the power supply to the motor 4. When the loaded cartridge 17 has been, in the camera, shielded from light, the microcomputer 19 causes the driver motor 24 to start opening of the film inlet/outlet light shielding door. Thus, the driver 22 is rotated, thus depressing the driver opening position detection switch 23a. At this time, the microcomputer 19 stops the rotation of the motor 26.

Then, the microcomputer 19 causes the film feeding motor 12 to wind the film so that a feeding Gear (not shown) rotates the fork gear 11 to rotate the spool in the engaged cartridge 17. As a result, the film is thrusted to pass through the film inlet/outlet of the film cartridge 17 so that the film is allowed to pass through between an aperture (not shown) and a pressure plate. Thus, the film is wound around the spool 12 so that the film is moved to a position at which a picture can be taken.

Then, the operation for opening the cartridge chamber cover 2 which is performed when the cartridge 17 is loaded will now be described. Initially, the cartridge chamber cover opening switch 15a is depressed and information of this depression is transmitted to the microcomputer 19. The microcomputer 19 confirms, by the detection switch 23b, that the driver 22 has closed the film inlet/outlet light shielding door of the cartridge 17 after the film has been rewound and thus the cartridge 17 has been in the light shielded state. Then, the microcomputer 19 causes electric power to be supplied to the cartridge chamber cover operating motor 4 so that the cartridge chamber cover 2 is moved from the closed position to the opened position. When the end of the cartridge chamber cover 2 has depressed the cartridge chamber opening completion detection switch 5b, information of this depression is transmitted to the microcomputer 19. Thus, the rotation of the motor 4 is stopped. When the cartridge ejection switch 21 is then depressed, electric power is so supplied that the cartridge conveying motor 8 is rotated in a direction in which the cartridge 17 is ejected. When the cartridge 17 has been separated from the engaged fork gear 11 and the driver 22 and moved to a position at which the cartridge 17 does not depress the cartridge ejection completion switch 9b, information of this is transmitted to the microcomputer 19 and, thus, power supply to the motor 8 is stopped. Since the insertion portion of the cartridge 17 is, at this time, stopped at a position at which the same is held between the rollers 6 and 8, the cartridge 17 is not thrown out undesirably thanks to the elastic forces of the rollers 6 and 8.

Furthermore, since the cartridge 17 held between the drive roller 6 and the roller 7, which is able to freely rotate, is retained with surface frictional force and pressure to an extent that spontaneous slipping down of the cartridge 17 taking place due to the dead weight can be prevented, then the cartridge 17 can easily manually be removed from the cartridge chamber 18. When the cartridge 17 has been moved to the ejection completion position, "ejection completion" is recognized by the user and urges the same to remove the cartridge 17 by turning the alarm lamp 30 on.

If the cartridge 17 has not been removed within a predetermined time after the ejection of the cartridge 17, giving of the alarm by means of the alarm lamp 30 is stopped, and the cartridge 17 is again introduced before the cartridge chamber cover 2 is closed. If the cartridge 17 has been completely removed from the cartridge chamber 18 within the predetermined time, the cartridge introduction start detection switch 9a is opened. This fact is detected by the microcomputer 19, thus causing the motor 4 to close the cartridge chamber cover 2 automatically or when the cartridge chamber closing switch 15b is depressed. When the end surface of the cartridge chamber cover 2 depresses the cartridge chamber closing completion position detection switch 5a, the microcomputer 19 stops the power supply to the motor 4.

Figure 2:
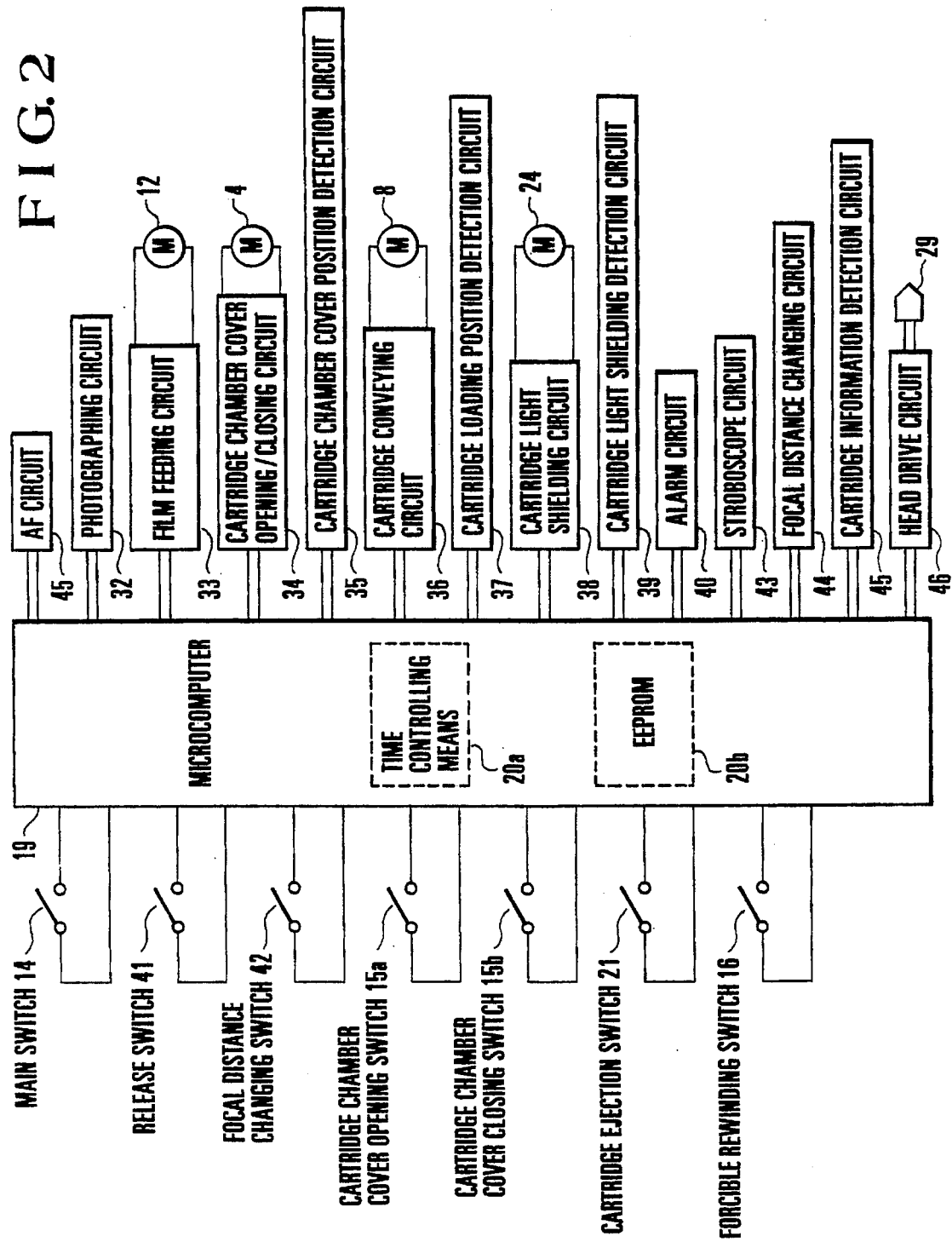
FIG. 2 is a block diagram which illustrates a circuit for use in the camera shown in FIG. 1.

FIG. 2 is a block diagram showing a circuit for use in the camera shown in FIG. 1. Referring to FIG. 2, reference numeral 19 represents the microcomputer 19 for controlling the camera, the microcomputer 19 including the foregoing time control circuit 20. Reference numeral 14 represents the main switch, 41 represents a release switch for taking a picture, 42 represents a focal-distance changing switch for changing the focal distance of a photographing lens, 15a represents cartridge chamber cover opening switch, 15b represents the cartridge chamber closing switch, 21 represents the cartridge ejection switch, 16 represents the film forcibly rewinding switch, and 45 represents an automatic range finding circuit which is not required for a fixed focus camera. Reference numeral 32 represents a photographing circuit for forwards/rearwards moving the photographing lens, performing automatic exposure (AE) and operating the shutter, diaphragm and the like. Reference numeral 33 represents a film feeding circuit for rotating the foregoing motor 12 that automatically winds/rewinds the film. Reference numeral 34 represents a cartridge chamber cover opening/closing circuit for rotating the motor 4 for opening/closing the cartridge chamber cover 2. Although the cartridge chamber cover 2 is formed into a slidable member in the structure shown in FIG. 1, the type of the cartridge chamber cover 2 is not limited.

Reference numeral 35 represents a cartridge chamber cover position detection circuit including the foregoing detection switches 5a and 5b to detect whether the cartridge chamber cover 2 has been brought to the opened position or the closed position. Reference numeral 36 represents a cartridge conveying circuit for rotating the motor 8 for introducing/ejecting the cartridge 17 into the camera by, for example, holding the cartridge 17 between the rollers 6 and 7. Reference numeral 37 represents a cartridge loading position detection circuit including the detection switches 9a, 10 and 9b for respectively detecting completion of the introduction of the cartridge 17 into the camera, that of loading of the same into the camera and that of the ejection of the same. Reference numeral 38 represents a cartridge light shielding circuit for rotating the motor 24 for opening/closing the film inlet/outlet light shielding door of the cartridge 17. If the film wound in the cartridge can be shielded from light by means of the plush or the like employed in place of the film inlet/outlet light shielding door, the cartridge light shielding circuit 38 is not required. Reference numeral 39 represents a cartridge light shielding detection circuit including the detection switches 23 and 23b for detecting the position of the light shielding door of the cartridge 17 whether the same is at the opened position or the closed position. If the film inlet/outlet light shielding door of the cartridge 17 is arranged to be closed after the film has been completely rewound in accordance with the camera feeding sequence, detection of the closing position for the film inlet/outlet light shielding door of the cartridge 17 by the cartridge light shielding detection circuit 39 will enable the completion of light shielding of the cartridge 17 to be detected. Furthermore, the state where the film is conveyed can be detected indirectly. Other methods of directly detecting the state where the film is conveyed will now be described.

The methods are exemplified by a method using the reflectance of the film such that the photoreflector 25 detects the presence/absence of the film; a method which can be employed in the case where a film having a magnetic layer is used and in which a signal possessed by the film is read by the magnetic head 29 to detect presence/absence of the film; and a method in which pulses from a pulse plate provided for the gear train (not shown), which is operated due to the surface friction between the film and the rollers that synchronize with the conveyance of the film or the engagement with perforations, are detected by the photoreflector (not shown) to store whether or not the film is present. Any method so far as capable of detecting whether or not the required film has been fed from the cartridge may be employed. Reference numeral 40 represents an alarm circuit 40 for giving the user of the camera an alarm by sound produced by a buzzer, voice, display by means of a liquid crystal display or the like or flickering light generated by an LED lamp or the like, the alarm circuit 40 including the alarm lamp 30. Reference numeral 43 represents stroboscope circuit. Reference numeral 44 represents a focal-distance changing circuit for changing the focal distance of the photographing lens in response to the depression of the focal-distance changing switch 42. Reference numeral 45 represents a cartridge information detection circuit including the photoreflector 25, the photosensor 27 and the photoreflector 28 and arranged to detect the "performance of the cartridge 17", such as the ISO sensitivity, the number of frames of the film with which pictures can be taken, whether the film is a negative film or a positive film and the like, the "state where the cartridge 17 is used", such as whether the film in the cartridge 17 has not been used or the same has been partially used or the same has been completely used and cartridge information, such as the "approach of the cartridge 17" to the inlet of the cartridge chamber 18. Reference numeral 46 represents a head drive circuit for operating the magnetic head 29 to read/write information to and from the magnetic layer of the film.

A main sequence of an operation to be performed by the foregoing structure and arranged to move the cartridge chamber cover 2 from the closed position to the opened position on the basis of the detection of the approach of the cartridge 17 will now be described with reference to a flow chart for the microcomputer 19 shown in FIG. 3. Hereinafter the steps of the sequences are expressed in figures in parentheses.

When the main switch 14 has been switched on (S100) and thus the microcomputer 19 has been activated (S101), the photosensor 27 of the cartridge information detection circuit 45 has detected the "approach of the cartridge 17" to the inlet of the cartridge chamber 18 (S102), the photoreflector 28 of the cartridge information detection circuit 45 starts detecting the state where the cartridge 17 is used. If the cartridge 17 can be used (in photography), a preparation for opening the cartridge chamber cover 2 is commenced (S103: NO). If the cartridge 17 has been used (S103: YES), the alarm circuit 40 gives an alarm to the user of the camera with sound, display or light that the cartridge chamber cover 2 cannot be opened because the cartridge 17 is a used cartridge 17 (S120). If the cartridge 17 can be used, whether or not the cartridge 17 is present in the camera is confirmed such that the cartridge loading completion detection switch 10 of the cartridge loading position detection circuit 37 detects whether or not loading of the cartridge 17 has been completed (S104), the following operation being divided on the basis of whether or not the cartridge 17 is present.

If the cartridge 17 is not present, the operation proceeds to a sub-routine for opening the cartridge chamber cover 2 to be described later so that the operation for opening the cartridge chamber cover 2 is commenced (S105). If the operation for opening the cartridge chamber cover 2 has been completed, the operation proceeds along 4b. If the opening operation of the cartridge chamber cover 2 has been stopped due to some trouble, the operation proceeds along 4c. The case, in which the cartridge 17 is not present in the camera in the initial state and as well as the cartridge chamber cover 2 has been opened, can be considered that the cartridge 17 will be loaded from outside. Therefore, when opening of the cartridge chamber cover 2 has been completed (4b), the operation proceeds to a cartridge introduction sub-routine to be described later so that the introduction of the cartridge 17 into the cartridge chamber 18 is commenced (S106). If no cartridge has been loaded in S106 (S106: 6d), and as well as if the cartridge chamber cover 2 has not been opened due to some trouble (S105: 4c), leaving of the cartridge chamber cover 2 open must be prevented such that the operation proceeds to a cartridge chamber cover closing sub-routine (S107) to be described later so that closing of the cartridge chamber cover 2 is performed.

Figure 3:
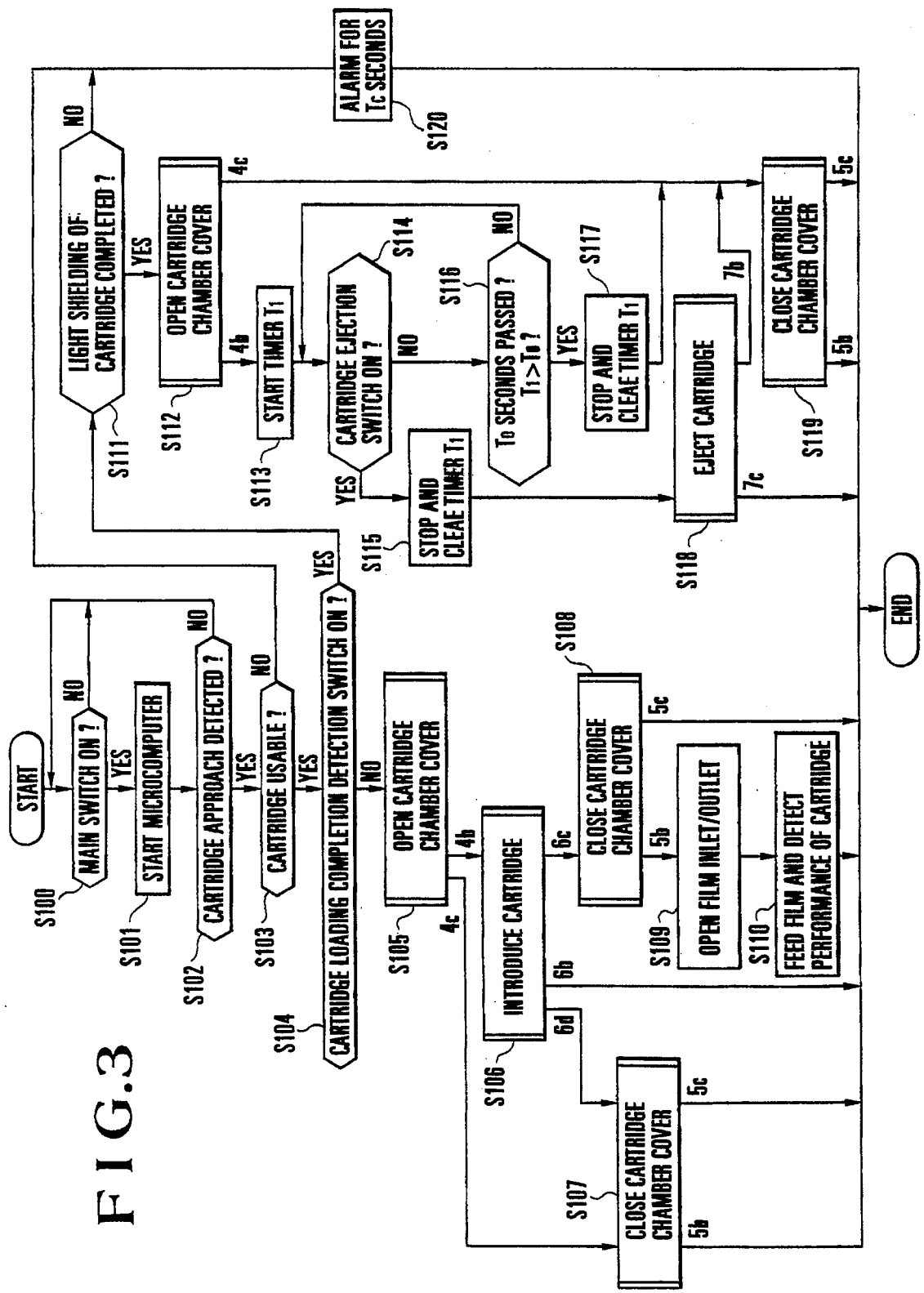
FIG. 3 is a flow chart showing a main sequence to be performed in the camera shown in FIG. 1 for opening the cartridge chamber cover.

In any of the cases where closing of the cartridge chamber cover 2 has been completed in S107 (S107: 5b) and where closing of the cartridge chamber cover 2 has been stopped (S107: 5c), the sequence shown in FIG. 3 is completed.

If the cartridge 17 has been completely loaded in S106 (S106: 6c), the operation proceeds to a cartridge chamber cover closing sub-routine (S108) to be described later so that closing of the cartridge chamber cover 2 is performed.

When closing of the cartridge chamber cover 2 has been completed, the cartridge light shielding circuit 38 opens the film inlet/outlet light shielding door (S109). Then, the film feeding circuit 33 conveys the film in the cartridge 17 to a position at which a picture can be taken (S110). Furthermore, during the foregoing conveyance, the "performance of the cartridge 17" is, by the photoreflector 25 of the cartridge information detection circuit 45, detected from the bar code on the end surface of the cartridge 17 that is rotated together with the film supply spool. Thus, the sequence shown in FIG. 3 is completed. If the cartridge 17 has been loaded and as well as the introduction operation has been stopped halfway (S106: 6b) or if closing of the cartridge chamber cover 2 has been stopped halfway (S108: 5c), the sequence shown in FIG. 3 is completed.

If the cartridge 17 is present in the cartridge chamber 18 in S104 (S104: YES), the cartridge light shielding detection circuit 39 detects whether or not the film has been completely rewound into the cartridge 17 by the film forcible rewinding switch 16, the film inlet/outlet light shielding door has been closed and thus shielding of the cartridge 17 from light has been completed. If the cartridge 17 has been shielded from light (S111: YES), the flow proceeds to a cartridge chamber cover opening sub-routine (S112) to be described later. If shielding of the cartridge 17 from light has not been complete (S111: NO), opening of the cartridge chamber cover 2 causes the film to be exposed to light. Therefore, opening of the cartridge chamber cover 2 is not performed but the alarm circuit 40 gives an alarm to the user of the camera for a predetermined time of Tc seconds with sound, display or light. Then, the sequence shown in FIG. 3 is completed. If opening of the cartridge chamber cover 2 has been completed in S112, the operation proceeds to 4b. If the opening operation has been stopped halfway, the operation proceeds to 4c. Since the presence of the cartridge 17 in the camera and opening of the cartridge chamber cover 2 can be considered that the state where the cartridge 17 is loaded is confirmed or that the cartridge 17 will be ejected to change the cartridge, a timer $T_1$ in the microcomputer 19 is started (S113), and depression of the cartridge ejection switch 21 from outside is, for To seconds, waited for (S114). If the cartridge ejection switch 21 has been depressed within $T_0$ seconds (S114: YES), the timer $T_1$ is reset (S115) and the operation proceeds to a cartridge ejection sub-routine to be described later so that the ejection of the cartridge 17 from the cartridge chamber 18 is started (S118). Note that the cartridge ejection switch 21 cannot be switched on only when opening of the cartridge chamber cover 2 has been completed. If the ejection of the cartridge 17 has been completed and as well as the cartridge 17 has been removed from the cartridge chamber 18, or if the cartridge 17 has been again completely loaded into the cartridge chamber 18 as described later (S118: 7b), or if opening of the cartridge chamber cover 2 has been stopped halfway in S112 or if the cartridge chamber 18 has been opened and as well as the cartridge ejection switch 21 has not been depressed within $T_0$ seconds (S116: YES), leaving of the cartridge chamber 18 open is prevented such that the operation proceeds to a cartridge chamber cover closing sub-routine to be described later so that closing of the cartridge chamber cover 2 is started. If the closing operation has been completed, the operation proceeds along 5b from S119. If the closing operation has been stopped halfway due to some trouble, the operation proceeds along 5c of S119.

If the cartridge chamber cover 2 has been completely closed, the operation proceeds along 5b from S110 and 5b from S119. If the cartridge chamber cover 2 is opened in a state where the cartridge 17 has been inserted, the operation proceeds along 6b from S116 and 7c from S118. If the cartridge chamber cover 2 has not been closed but the same has been stopped halfway, the operation proceeds along 5c from S108 and 5c from S119.

It can be understood that use of the cartridge chamber opening sequence shown in FIG. 3 in a case of non-trouble opening/closing of the cartridge chamber cover 2 and conveyance of the cartridge 17 is able to prevent loading of a used cartridge and enables a cartridge, which can be used, to be subjected to a process from a moment the cartridge chamber 18 is opened to a moment the same is shielded from light without use of the cartridge chamber cover opening and closing switches 15a and 15b.

A main sequence for moving the cartridge chamber cover 2 from the opened position to the closed position by depressing the cartridge chamber closing switch 15b will now be described with reference to a flow chart for the microcomputer 19 shown in FIG. 4. The foregoing sequence is used in the case where the cartridge chamber 18 is left open due to some trouble during the sequence for opening the cartridge chamber cover 2 shown in FIG. 3 or in the case where the cartridge chamber cover 2 is forcibly closed during the sequence. When the main switch 14 is switched on (S200) so that the microcomputer 19 is activated (S201); the cartridge chamber cover closing switch 15b is depressed; and information of this depression is transmitted to the microcomputer 19 (S202). The process may be constituted such that step S202 is replaced by step S200 so as to cause depression of the cartridge chamber cover closing switch 15b to activate the microcomputer 19.

Then, regardless of the state of the cartridge chamber cover 2, the operation proceeds to a cartridge chamber cover closing sub-routine to be described later so that closing of the cartridge chamber cover 2 is started (S203). In a case where closing of the cartridge chamber cover 2 has been completed, the operation proceeds along 5b from S203. If the same has not been completed, the operation proceeds along 5c from S203. If closing has been completed, the cartridge loading completion detection switch 10 of the cartridge loading position detection circuit 37 detects whether the cartridge 17 has been completely loaded in the camera or the same is not present (S204). If the cartridge 17 is present (S204: YES), the cartridge light shielding circuit 26 opens the film inlet/outlet light shielding door of the cartridge 17 (S205). Then, the film feeding circuit 33 conveys the film to the position at which a picture can be taken (S206), and the sequence shown in FIG. 4 is completed.

In a case where closing of the cartridge chamber cover 2 has been completed in S203 and as well as the cartridge 17 is not present in the camera (S204: NO), this sequence is completed. If the cartridge chamber cover 2 cannot be closed completely in S203 (S203: 5c), the operation contrarily proceeds to the cartridge chamber cover opening sub-routine so that the cartridge chamber cover 2 is closed (S207). Regardless of completion or incompletion of the closing operation, the sequence shown in FIG. 4 is completed.

Figure 4:
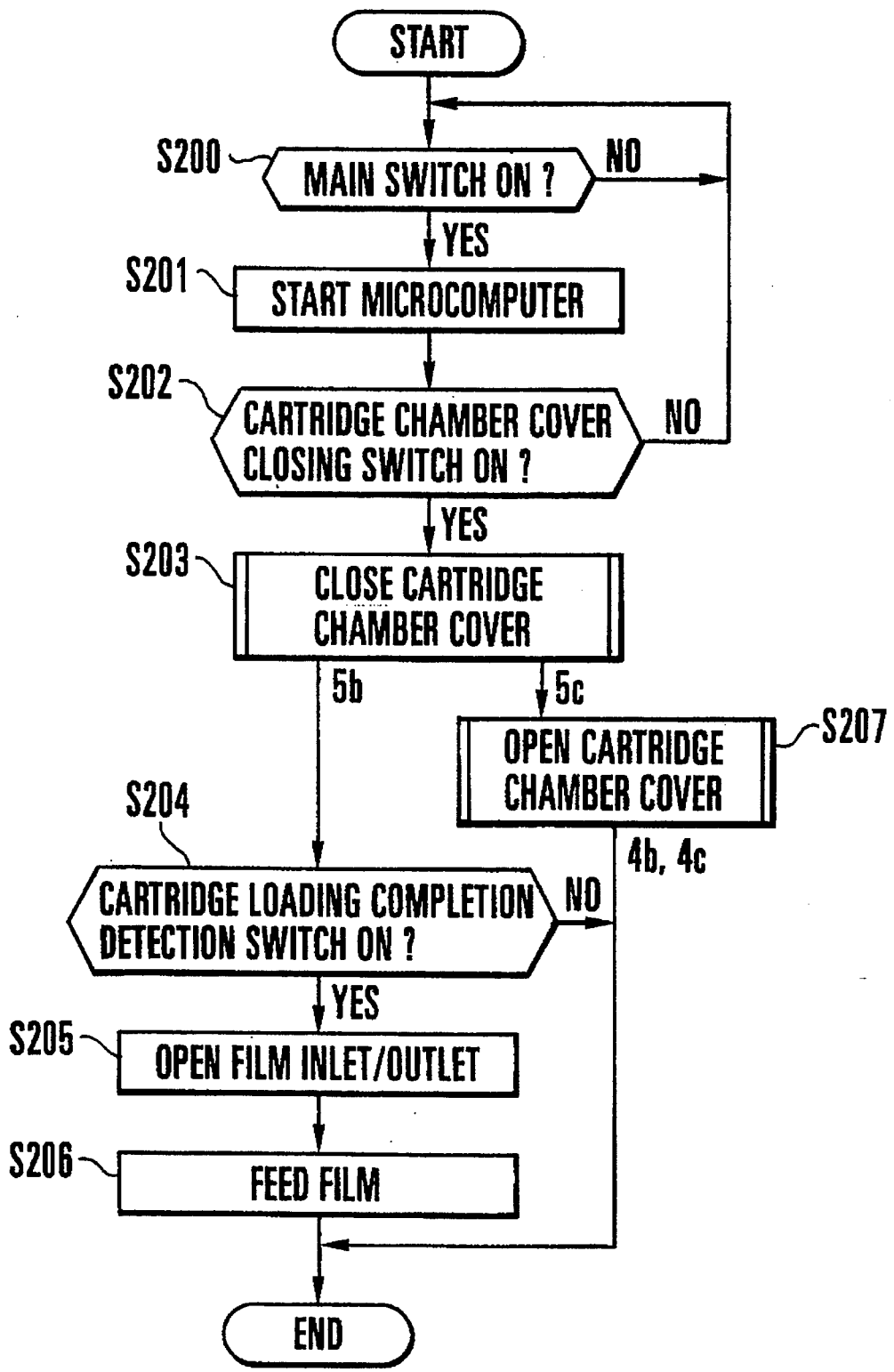
FIG. 4 is a flow chart showing a main sequence to be performed in the camera shown in FIG. 1 for closing the cartridge chamber cover.

The sequences shown in FIGS. 3 and 4 are main sequences of the cartridge approach detection to be performed when the cartridge chamber cover closing switch 15b is depressed.

Figure 5:
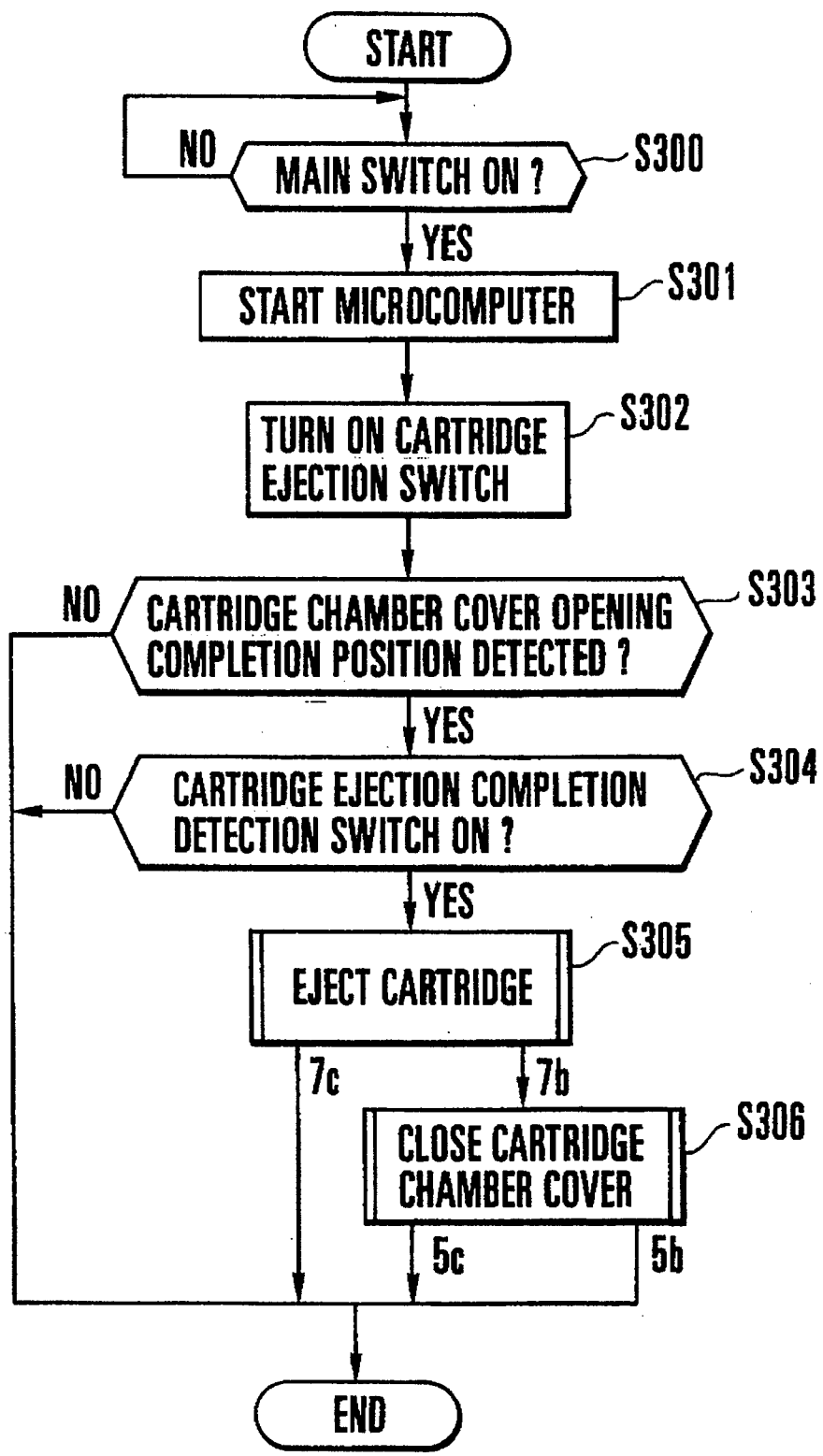
FIG. 5 is a flow chart showing a sequence to be performed in the camera shown in FIG. 1 for ejecting the cartridge.

FIG. 5 shows a sequence in which the cartridge ejection switch 21 is depressed to move the cartridge 17 from the loaded position to a position at which the cartridge 17 can be removed by the fingers.

The main switch 14 is switched on (S300), the microcomputer 19 is thus activated (S301), the cartridge ejection switch 21 is depressed and information of this depression is transmitted to the microcomputer 19 (S302). Step S302 may be replaced by step S300 to cause depression of the cartridge ejection switch 21 to activate the microcomputer 19.

Then, whether or not the cartridge chamber cover 2 interrupts the ejection of the cartridge 17 is discriminated by the cartridge chamber cover position detection circuit 35 based on whether or not closing of the cartridge chamber cover 2 has been completed (S303). If the same interferes the ejection, the sequence is completed (S303: YES). If the same does not interfere the ejection (S303: NO), whether or not the cartridge 17 has been placed at a position at which the cartridge 17 can be ejected is discriminated by the cartridge ejection completion detection switch 9b of the cartridge loading position detection circuit 37 (S304). When the cartridge 17 has been brought to the ejection completion position, the sequence is completed (S304: NO). If the cartridge 17 can be ejected (S304: YES), the operation proceeds to a cartridge ejection sub-routine to be described later so that the cartridge 17 is ejected from the cartridge chamber 18 (S305). If the ejection of the cartridge 17 has been incompletely stopped, this sequence is stopped (S305: 7c). If the ejection of the cartridge 17 has been completed, leaving of the cartridge chamber cover 2 open must be prevented such that the operation proceeds to a cartridge chamber cover closing sub-routine (S306) to be described later so that closing of the cartridge chamber cover 2 is performed. If closing of the cartridge chamber cover 2 has been completed in S306, the operation proceeds along 5b of S306. If the closing of the cartridge 17 has been resulted incompletely, the operation proceeds along 5c of S306. In any case, this sequence is completed.

Figure 6:
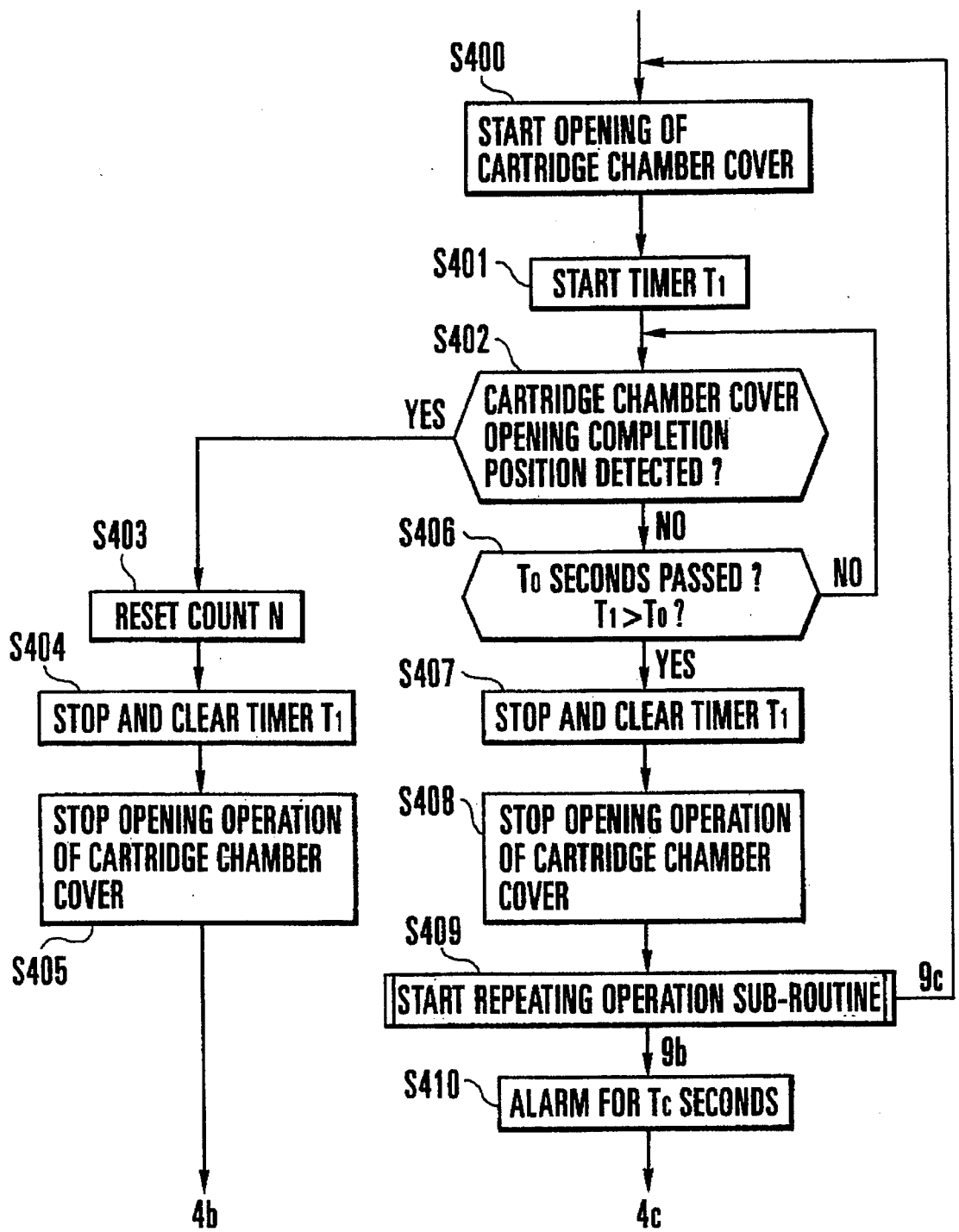
FIG. 6 is a flow chart showing a sub-routine to be performed in the camera shown in FIG. 1 for opening the cartridge chamber cover.

Sub-routines for respectively opening, closing, introducing and ejecting the cartridge, and a sub-routine for performing a repeated operation to be performed if the operation has been performed incompletely shown in FIGS. 3, 4 and 5 will now be described. FIG. 6 shows the sub-routine for opening the cartridge chamber cover 2 shown in S105 and S112 shown in FIG. 3 and S207 shown in FIG. 4. Initially, the cartridge chamber cover opening/closing circuit 34 starts rotating the motor 4 for moving the cartridge chamber cover 2 (S400). The timer $T_1$ in the microcomputer 19 is started which measures predetermined time $T_0$, which is sufficiently long for the cartridge 17 to be moved from the closed position to the opened position (S401). If completion of opening of the cartridge chamber cover 2 has not been detected within $T_0$ seconds by the cartridge chamber cover position detection circuit 35, is determined that the cartridge chamber 18 cannot be operated due to some trouble. Thus, the timer $T_1$ serves as a trouble detection means. Opening of the cartridge chamber cover 2 is repeatedly detected (S402) until the timer $T_1$ measures $T_0$ seconds (S406). If the cartridge chamber cover 2 has been completely opened within $T_0$ seconds (S402: YES), the operation proceeds to a sub-routine to be described later so that count N in the repeated operation sub-routine in S409 to be described later is reset (S403), the timer $T_1$ is reset (S404), the operation for opening the cartridge chamber cover 2 is stopped (S405) and thus the operation is removed from this sub-routine (4b).

If completion of opening of the cartridge chamber cover 2 has not been detected within $T_0$ seconds (S406: YES), the timer $T_1$ is reset (S407), opening of the cartridge chamber cover 2 is temporarily stopped (S408) and a sub-routine for opening the cartridge chamber cover 2 to be described later is performed (S409). If the repeated operation sub-routine performed by a predetermined number of times (S409: 9c) results in incompletion of opening of the cartridge chamber cover 2 (S409: 9b), the alarm circuit 40 gives an alarm to the user of the camera for Tc seconds with sound, display or light that the operation for opening the cartridge chamber cover 2 has not been completed (S410) and the operation is removed from the foregoing sub-routine (4c). If opening of the cartridge chamber cover 2 has been completed as a result of the repeated operation sub-routine (from S409: 9c to S402: YES), the operation proceeds to 4b similarly to the foregoing operation.

Figure 7:
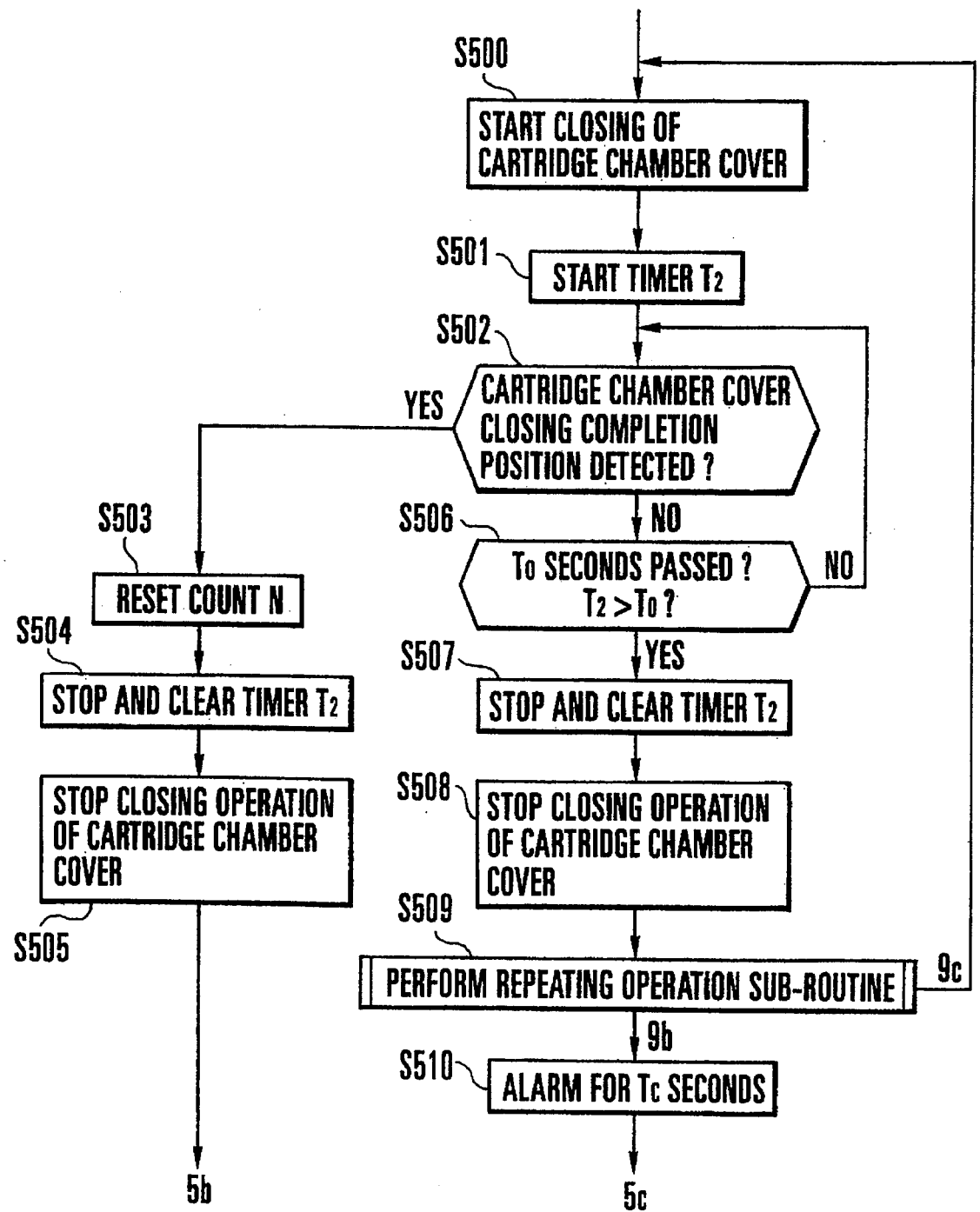
FIG. 7 is a flow chart showing a sub-routine to be performed in the camera shown in FIG. 1 for closing the cartridge chamber cover.

FIG. 7 shows the sub-routine for closing the cartridge chamber cover 2 as shown in S107, S108 and S119 shown in FIG. 3 and S203 show in FIG. 4. Initially, the cartridge chamber cover opening/closing circuit 34 rotates the motor 4 for operating the cartridge chamber cover 2 (S500). Initially, the cartridge chamber cover opening/closing circuit 34 starts rotating of the motor 4 for moving the cartridge chamber cover 2 (S500). Then, the timer $T_2$ in the microcomputer 19 is started (S501) which measures a predetermined time of $T_0$ seconds, which is sufficiently long for the cartridge chamber cover 2 to be, without any trouble, moved from the position at which opening of the cartridge 17 is completed to the position at which closing of the same is completed. If completion of closing of the cartridge chamber cover 2 has not been detected within $T_0$ seconds by the cartridge chamber cover position detection circuit 35, it is determined that the cartridge chamber cover 2 cannot be operated due to some trouble, such as catch of the finger or the like within the cartridge insertion port by the cartridge chamber cover 2. Thus, the timer $T_2$ also serves as a foreign-matter detection means. Closing of the cartridge chamber cover 2 is repeatedly detected (S502) until the timer $T_2$ measures $T_0$ seconds (S506). If the cartridge chamber cover 2 has been completely closed within $T_0$ seconds (S502: YES), count N in a sub-routine for performing a repeated operation in S509 to be described later is reset (S503), the timer $T_2$ is reset (S504), the operation for closing the cartridge chamber cover 2 is stopped (S505) and thus the operation is removed from this sub-routine (5b).

If completion of closing of the cartridge chamber cover 2 has not been detected within $T_0$ seconds (S506: YES), the timer $T_2$ is reset (S507), closing of the cartridge chamber cover 2 is temporarily stopped (S508) and a repeated operation sub-routine for again closing the cartridge chamber cover 2 to be described later is performed (S509: 9a). If the repeated operation sub-routine performed by a predetermined number of times (S509: 9c) has resulted in incompletion of closing of the cartridge chamber cover 2 (S509: 9b), the alarm circuit 40 gives an alarm to the user of the camera for Tc seconds with sound, display or light that closing of the cartridge chamber cover 2 has not been completed (S510) and the operation is removed from the foregoing sub-routine (5c). If closing of the cartridge chamber cover 2 has been completed as a result of the repeated operation sub-routine (from S509: 9c to S502: YES), the operation proceeds to 5b similarly to the foregoing operation.

Figure 8:
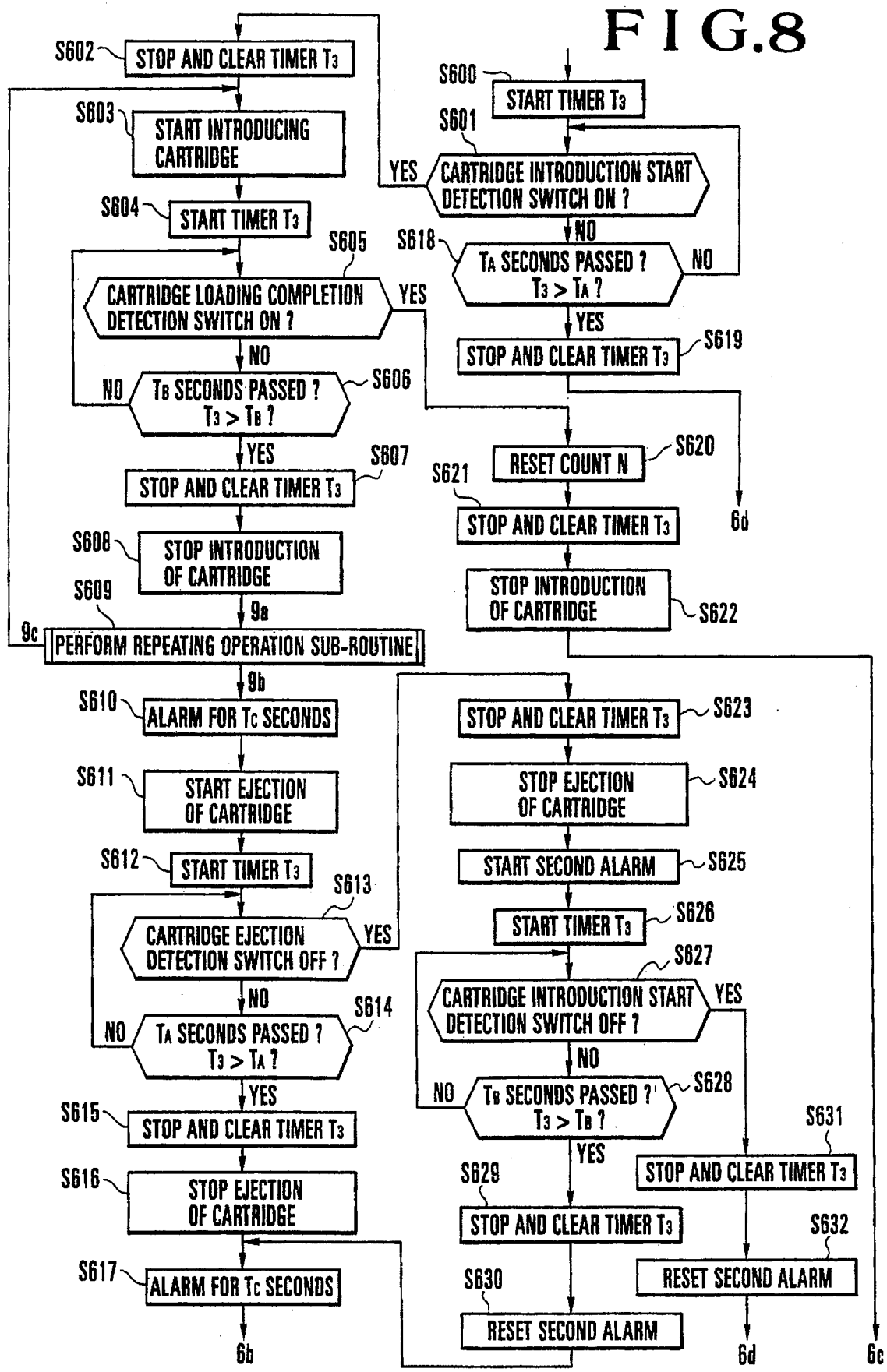
FIG. 8 is a flow chart showing a sub-routine to be performed in the camera shown in FIG. 1 for introducing the cartridge.

FIG. 8 shows a cartridge introduction sub-routine in S103 shown in FIG. 3. Initially, a timer $T_3$ in the microcomputer 19 for measuring a limit time $T_A$ allowed for the cartridge 17 to be loaded is started (S600). If introduction of the cartridge 17 into the cartridge chamber 18 has not been detected within the time $T_A$ by the cartridge introduction start detection switch 9a of the cartridge loading position detection circuit 37, a discrimination is made that the user of the camera has no intention to load the cartridge 17 (S618: YES), the timer $T_3$ is reset (S619) and the operation is removed from the foregoing sub-routine (6d). If the introduction of the cartridge 17 has been detected within $T_A$ seconds (S601: YES), the timer $T_3$ is reset (S602), and the cartridge conveying circuit 36 starts rotating of the motor 8 for introducing the cartridge 17 (S603) to rotate the cartridge conveying roller 6 to introduce the cartridge 17. Simultaneously, the timer $T_3$ in the microcomputer 19 is started (S604) which measures a predetermined time $T_B$ which is sufficiently long for the cartridge 17 to be loaded completely from the introduced position. During the cartridge introducing time of $T_3$ seconds (S606) the cartridge 17 is introduced between the introducing rollers 6 and 7, the cartridge 17 being further introduced due to the rotational force of the roller 6. Then, whether or not the cartridge 17 has been completely loaded is repeatedly detected by the cartridge loading completion detection switch 10 of the cartridge loading position detection circuit 37 (S605). If the completion of loading of the cartridge 17 has been detected within $T_B$ seconds (S605: YES), count N in the repeated operation sub-routine in S609 to be described later is reset (S620), the timer $T_3$ is reset (S621), the cartridge introduction operation is completed (S622) and the operation is removed from the foregoing sub-routine (6c).

If loading of the cartridge 17 within $T_B$ seconds has not been detected (S606: YES), the timer $T_3$ is reset (S607), introduction of the cartridge 17 is temporarily stopped (S608) and a repeated operation sub-routine for again introducing the cartridge 17 to be described later is performed (S609). If the repeated operation sub-routine performed by a predetermined number of times (S609: 9c) results in incompletion of loading of the cartridge 17 (S609: 9b), the alarm circuit 40 gives an alarm to the user of the camera for Tc seconds with sound, display or light that introduction of the cartridge 17 has been performed incompletely (S610). Then, the cartridge 17, which is considered that it has not been completely loaded, is ejected from the cartridge chamber 18 by the cartridge conveying circuit 36 (S611).

If loading of the cartridge 17 has been completed due to the repeated operation sub-routine (from S609: 9c to S650: YES), the operation proceeds to 6c similarly to the foregoing operation.

Simultaneously with the start of the cartridge ejection operation in S611, the timer $T_3$ in the microcomputer 19 is started (S612) which measures a predetermined time of $T_A$ seconds, which is sufficiently long for the cartridge 17 to be ejected from the position at which loading of the cartridge 17 is completed to the position at which the ejection is completed. The cartridge ejection completion detection switch 9b of the cartridge chamber cover position detection circuit 35 repeatedly detects completion of the ejection of the cartridge 17 within $T_A$ seconds (S613, S614: NO). If the ejection has not been detected within $T_A$ seconds (S614: YES), a discrimination is made that the cartridge 17 is incompletely loaded while being inhibited from being introduced and ejected. Thus, the timer $T_3$ is reset (S615) and the cartridge ejection operation is stopped (S616). Then, the alarm circuit 40 gives an alarm to the user of the camera for Tc seconds with sound, display or light that the introduction of the cartridge 17 has not been completed (S617). Then, the operation is removed from the foregoing sub-routine (6b).

In a case where although the cartridge 17 has been loaded and introduced, loading has not been completed and thus the cartridge 17 has been moved to a position at which the cartridge 17 can be removed by the hand (S613: YES), the timer $T_3$ is reset (S623) and the cartridge ejection operation is completed (S624). Then, the alarm circuit 40 gives a second alarm, which is another alarm for notifying the user of the camera that the cartridge 17 is positioned at a position at which the cartridge 17 can be removed and urging the user to remove the cartridge 17 (S625). For example, an alarm lamp 30 or the like, as shown in FIG. 1, disposed sidewardly adjacent to the inlet port for the cartridge 17 enables the user to recognize the alarm lamp 30 even in a dark portion and the position from which the cartridge 17 will be ejected.

When the second alarm has been given, the timer $T_3$ is started (S626) which measures a predetermined time of $T_B$ seconds, which is a limit time for the user to remove the cartridge 17. The cartridge introduction start detection switch 9b of the cartridge loading position detection circuit 35 repeatedly detects whether or not the cartridge 17 has been removed (S627). If the removal has been detected (S627: YES), the timer $T_3$ is reset (S631), the foregoing second alarm is stopped (S632), and the operation is removed from the foregoing sub-routine (6c) in a state where the cartridge chamber 18 is empty and as well as the same is opened. If the removal has not been detected (S628: YES), the timer $T_3$ is reset (S629) and the alarm circuit 40 gives an alarm to the user of the camera for Tc seconds with sound, display or light that the cartridge 17 has been introduced into the cartridge chamber 18 in a state where the cartridge 17 can be removed by the fingers, the cartridge chamber cover 2 is left open and the introduction of the cartridge 17 has not been completed. Then, the operation is removed from the foregoing sub-routine (6d).

Figure 9:
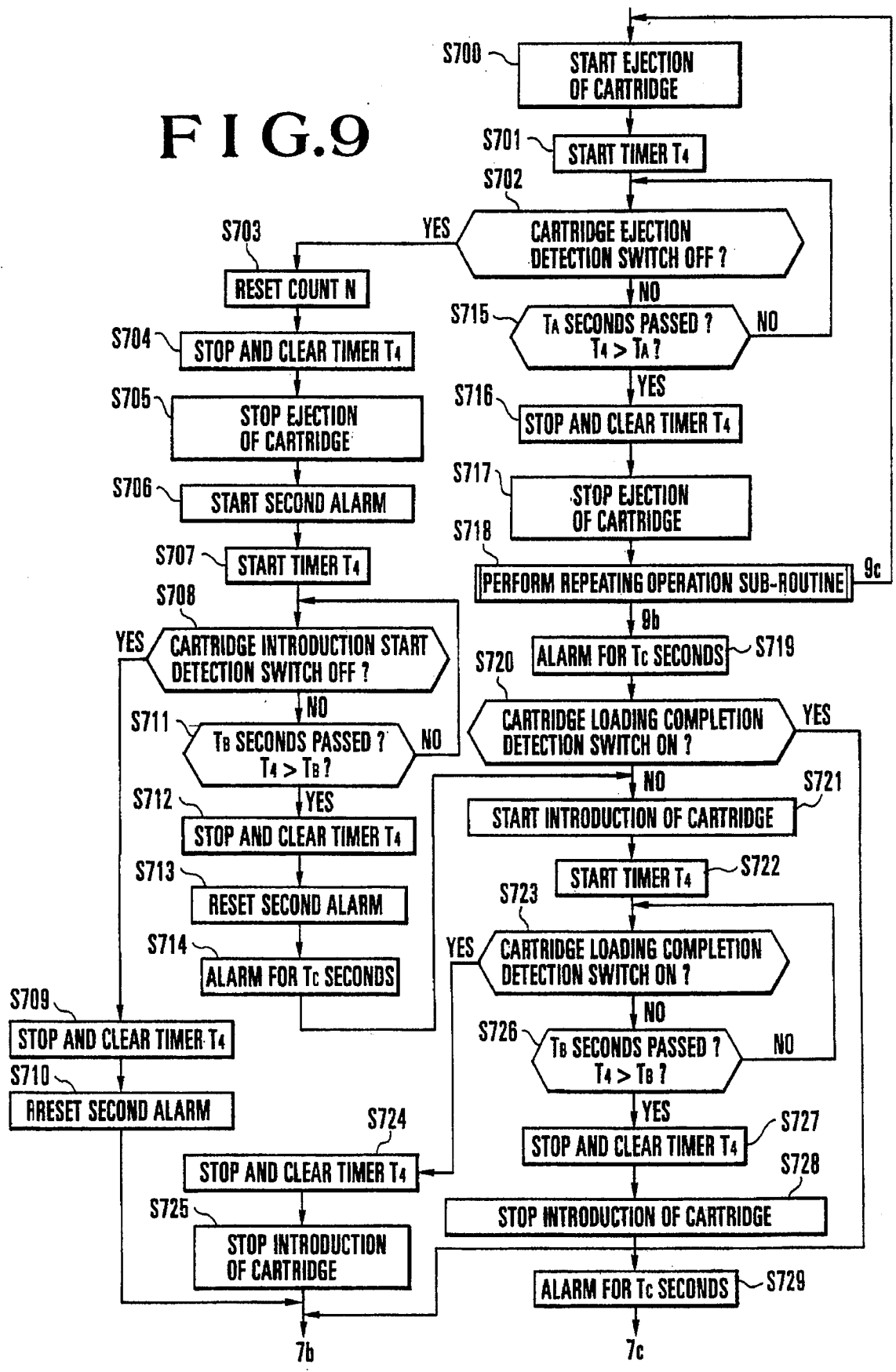
FIG. 9 is a flow chart showing a sub-routine to be performed in the camera shown in FIG. 1 for ejecting the cartridge.

FIG. 9 shows the sub-routine for ejecting the cartridge shown in step S118 shown in FIG. 3 and S305 shown in FIG. 5. Initially, the cartridge conveying circuit 36 rotates the motor 8 for ejecting the cartridge 17 (S700) so that the cartridge conveying roller 6 is rotated. Simultaneously, the timer $T_4$ in the microcomputer 19 is started (S701) which measures time of $T_A$ seconds, which is sufficiently long for the cartridge 17 to be, without a trouble, moved from the position, at which the cartridge 17 can be completely loaded to a position, at which the ejection of the cartridge 17 is completed. The cartridge ejection completion detection switch 9b of the cartridge loading position detection circuit 37 repeatedly detects the completion of the ejection of the cartridge 17 until the timer $T_4$ measures $T_A$ seconds (S702). If the completion of the ejection of the cartridge 17 has been detected within $T_A$ seconds, while including a case where the cartridge 17 has not been loaded (S702: YES), count N in a repeated operation sub-routine in S718 to be described later is reset (S703), the timer $T_4$ is reset (S704) and thus the cartridge ejection operation is completed (S705).

If the ejection has not been detected within $T_A$ seconds (S715: YES), the timer $T_4$ is reset (S716), the cartridge ejection operation is temporarily stopped (S717), and the operation proceeds to a repeated operation sub-routine to be described later for again performing the repeated ejection operation (S718). If the completion of the ejection has been detected (S702: YES) before the repeated sub-routine is performed by a predetermined times (S818: 9c), the operation proceeds to S704. If the completion of the ejection has not been detected although the repeated operation sub-routine had been performed by a predetermined times (S718: 9b), the alarm circuit 40 gives an alarm to the user of the camera for Tc seconds with sound, display or light that the ejection of the cartridge 17 has not been completed (S719). Then, the cartridge loading completion detection switch 10 of the cartridge loading position detection circuit 37 detects whether the cartridge 17 has not been moved or the same has been somewhat moved (S720). If the cartridge 17 has not been moved (S720: YES), the operation is removed from the sub-routine (7b). In a case where the cartridge 17 has been somewhat moved (S720: NO), the cartridge conveying circuit 36 again performs the introduction operation (S721).

If the ejection of the cartridge 17 has been completed in (S705) and thus the cartridge ejection operation has been completed, the alarm circuit 40 turns on, for example, a lamp disposed adjacent to the insertion port of the cartridge chamber 18 so as to give a second alarm, which is different from the foregoing alarm so that ejection of the cartridge 17 is notified to the user of the camera.

Then, the timer $T_4$ is started (S707) which measures a predetermined waiting limit time of $T_B$ seconds (S711), which is required to eject the cartridge 17. Then, the cartridge introduction start detection switch 9a of the cartridge chamber cover position detection circuit 35 repeatedly detects the completion of the ejection of the cartridge 17 until the predetermined time $T_B$ passes (S708). If ejection of the cartridge 17 has been detected within the predetermined time $T_B$ (S708: YES), the timer $T_4$ is reset (S709) and the operation is removed from the foregoing sub-routine (7b).

If the completion of the ejection has not been detected within the predetermined time $T_B$ (S711: YES), the timer $T_4$ is reset (S712), giving of the second alarm is stopped (S713) and the alarm circuit 40 gives an alarm to the user of the camera with sound, display or light for Tc seconds that the ejection of the cartridge 17 has not been completed (S714). Then, introduction of the cartridge 17, which has been left from ejection, into the camera is started. The cartridge conveying circuit 36 rotates the motor 8 for introducing the cartridge 17 (S721) so that the cartridge conveying roller 6 is operated to introduce the cartridge 17. At this time, since the cartridge 17 is being held by the rollers 6 and 7 due to the operation in S714 and S720: NO, then the introduction operation is performed. Simultaneously, the timer $T_4$ starts measuring of $T_B$ seconds, which is sufficiently long for the cartridge 17 to be conveyed from a predetermined cartridge introduction position to a position at which loading of the cartridge 17 is completed (S722). Then, the detection of the completion of loading of the cartridge 17 is repeatedly performed for $T_B$ seconds (S726). If it has been detected within the predetermined time of $T_B$ seconds by the cartridge loading completion detection switch 10 of the cartridge loading position detection circuit 37 (S723: YES), the timer $T_4$ is reset, the introduction of the cartridge 17 is completed (S725) and the operation is removed from the foregoing sub-routine (7b).

If the completion of loading of the cartridge 17 has not been detected within the predetermined time of $T_B$ seconds (S726: YES), the timer $T_4$ is reset (S727), the introduction of the cartridge 17 is immediately stopped (S728) and the alarm circuit 40 gives an alarm to the user of the camera for Tc seconds with sound, display or light that loading of the cartridge 17 has not been completed (S729). Then, the operation is removed from the foregoing sub-routine.

Figure 10:
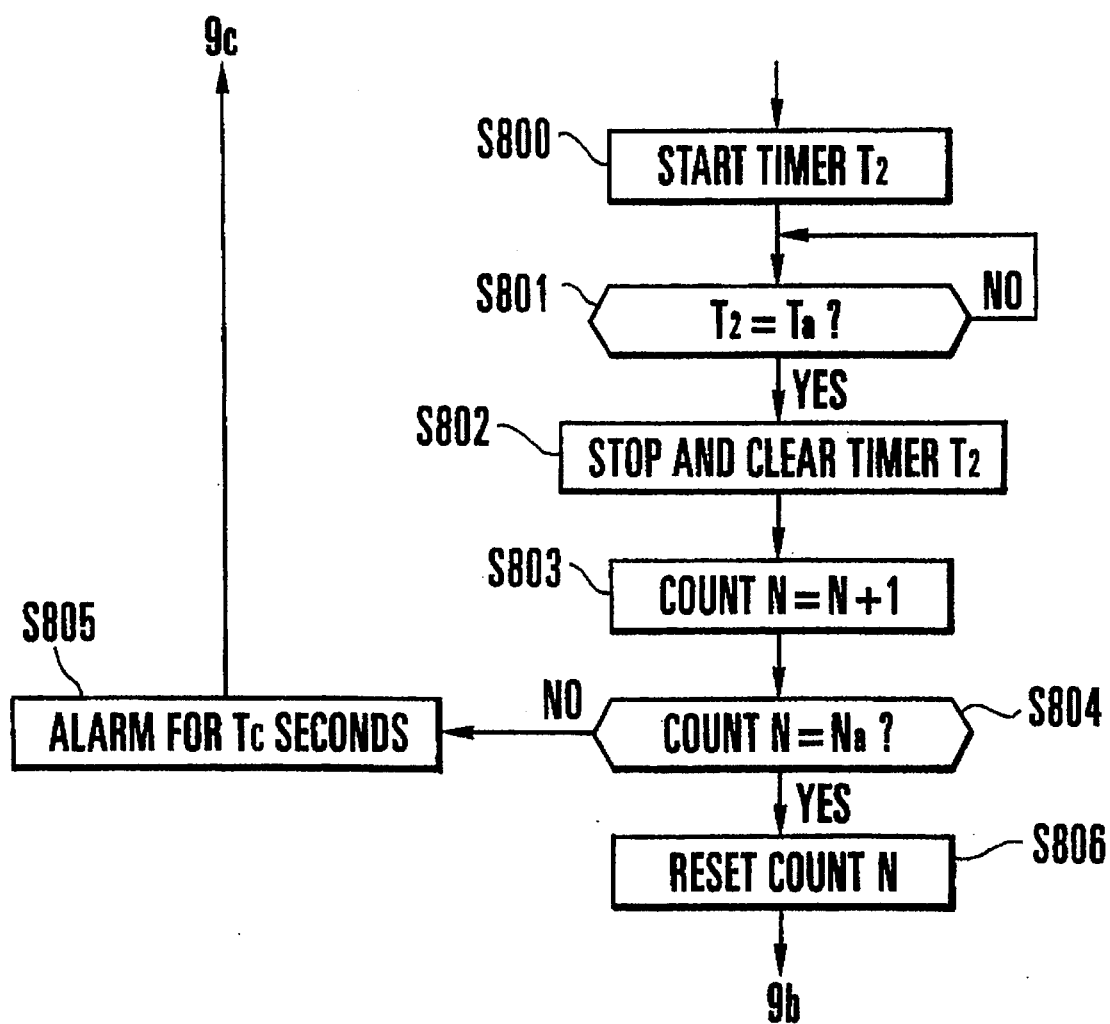
FIG. 10 is a flow chart showing a sub-routine to be performed in the camera shown in FIG. 1 for performing a repeated operation.

FIG. 10 shows the sub-routine for performing the repeated operation in S409 shown in FIG. 6, S509 shown in FIG. 7, S609 shown in FIG. 8 and S718 shown in FIG. 9. The repeated operation is performed in a case where opening or closing of the cartridge chamber 18 or the ejection or the introduction of the cartridge 17 has been performed incompletely for the purpose of again performing the same operation automatically. The foregoing operation is performed if the desired operation has been performed incompletely. After the desired operation has been performed incompletely, the same operation is again performed such that the desired operation is stopped; the timer $T_2$ is started (S800); and the desired operation is stopped for a predetermined time Ta. After the timer $T_2$ has measured the predetermined time Ta (S801), the timer $T_2$ is reset (S802) and counting of the number N of the repeated operations is started (S803). Thus, the operation proceeds to a loop in which the same operation is performed until number N of the repeated operations reaches a predetermined number of times Na (S804: NO).

In order to notify the incomplete operation to the user of the camera, the alarm circuit 40 gives an alarm to the user of the camera for Tc seconds with sound, display or light. Then, the operation returns to the initial loop for the desired operation (S805), and then the operation is removed from the foregoing sub-routine (9c). If the desired operation has not been completed although the number N of the repeated operations has reached a desired times of Na (S804: YES), the count N is reset and the operation is removed from the foregoing sub-routine (9b).

If the repeated operation is not required for the sequence, the sub-routine shown in FIG. 10 may be omitted. By making the number N of the repeated operations such that Na=1, the operation is able to proceed to a next sequence while eliminating the necessity of proceeding to the repeated loop (S804: NO).

Since the first embodiment of the present invention inhibits opening of the cartridge chamber cover when a used cartridge is intended to be loaded into a camera, double exposure can be prevented.

A second embodiment of the present invention will now be described.

Figure 11:
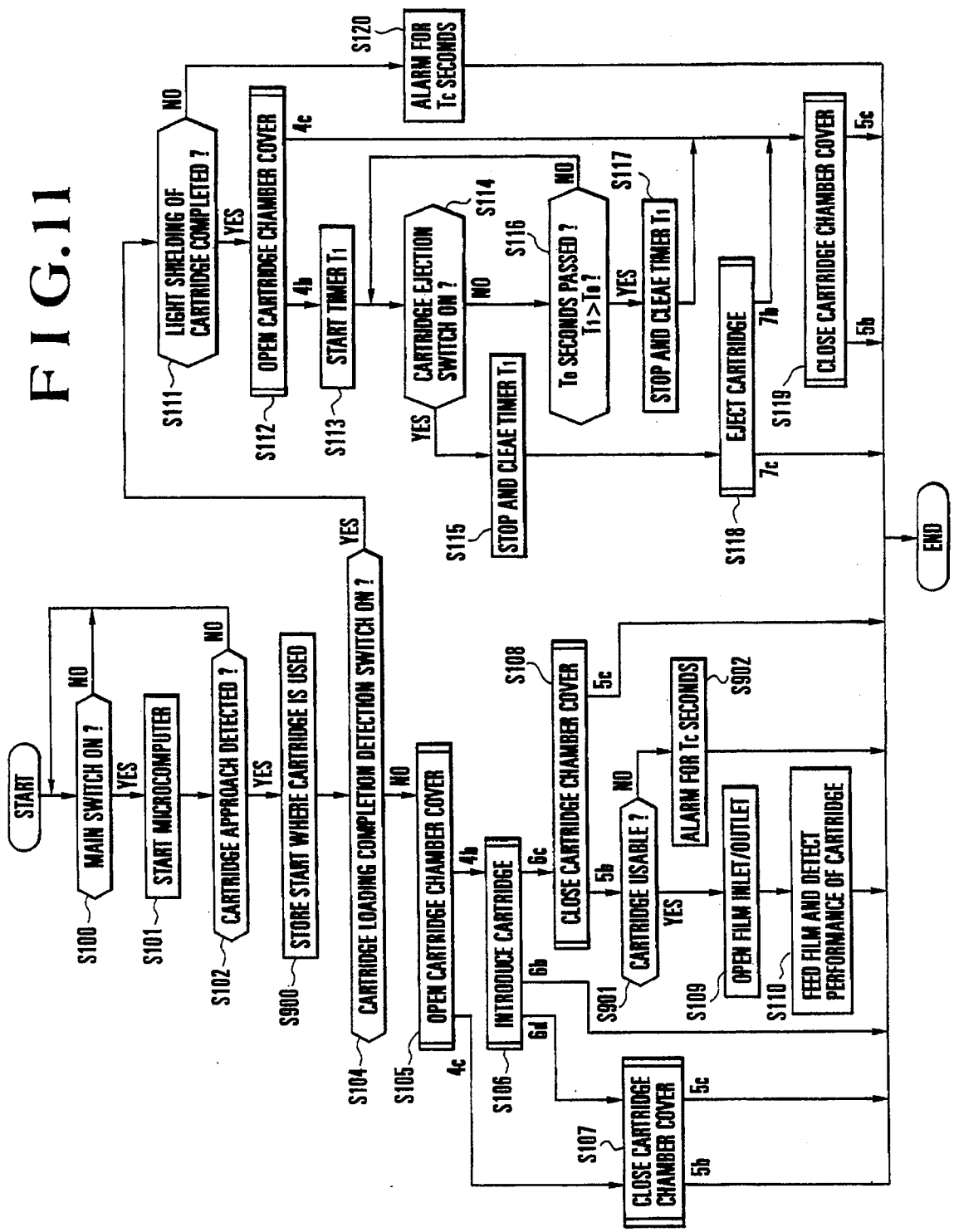
FIG. 11 is a flow chart showing a main sequence to be performed in a camera according to a second embodiment of the present invention for opening a cartridge chamber cover.

FIG. 11 illustrates a main sequence of a second embodiment of the present invention to be performed when the cartridge chamber cover is moved from the closed position to the opened position based on the detection of approach of the cartridge. Since the structure and operation of the camera according to this embodiment are the same as those according to the first embodiment except for a sequence shown in FIG. 11 which is constituted by partially changing the sequence shown in FIG. 3, their descriptions are omitted here. As for omitted portions, see FIGS. 2 and 3 to 10.

Referring to FIG. 11, the same steps as those shown in FIG. 3 are given the same step numbers and their descriptions are omitted here.

Referring to FIG. 11, when approach of the cartridge 17 has been detected in S102, whether or not the cartridge 17 can be used is discriminated (S103). The result of the detection of the "state where the cartridge 17 is used" is stored in a memory of the microcomputer 19 (S900). When the cartridge chamber cover 2 is opened, the cartridge 17 is completely loaded, and the cartridge chamber cover 2 is closed (S108: 5b), stored information of the result of the detection of the "state where the cartridge 17 is used" is read. If one or more frames are left in the cartridge 17 (S901: YES), the film inlet/outlet light shielding door of the cartridge 17 is opened (S109) to convey the film to the position at which a picture can be taken (S110). If the cartridge 17 has been used and therefore a picture cannot be taken (S901: NO), the alarm circuit 40 gives an alarm to the user of the camera for Tc seconds with sound, display or light that the camera loaded into the camera has been used (S902). Then, the foregoing sequence is completed here.

The foregoing second embodiment of the present invention enables the cartridge 17 to be loaded even if a detection is made that cartridge 17 to be loaded into the camera is a used cartridge before loading. Therefore, a used cartridge can be loaded into a camera and thus the camera can be carried. Since the cartridge chamber cover 2 is closed in a state where the film inlet/outlet light shielding door of the loaded cartridge 17 is closed, depression of the cartridge chamber cover opening switch 15a enables the cartridge chamber cover 2 to be opened immediately. As a result, the operation can be performed quickly.

The first and second embodiments enable the detection of the state where the cartridge is used to be performed when the cartridge has not been loaded and thus it is positioned on the outside of the camera.

A third embodiment will now be described which has a structure that the state where the cartridge is used is detected at the wall of the cartridge chamber.

Figure 12:
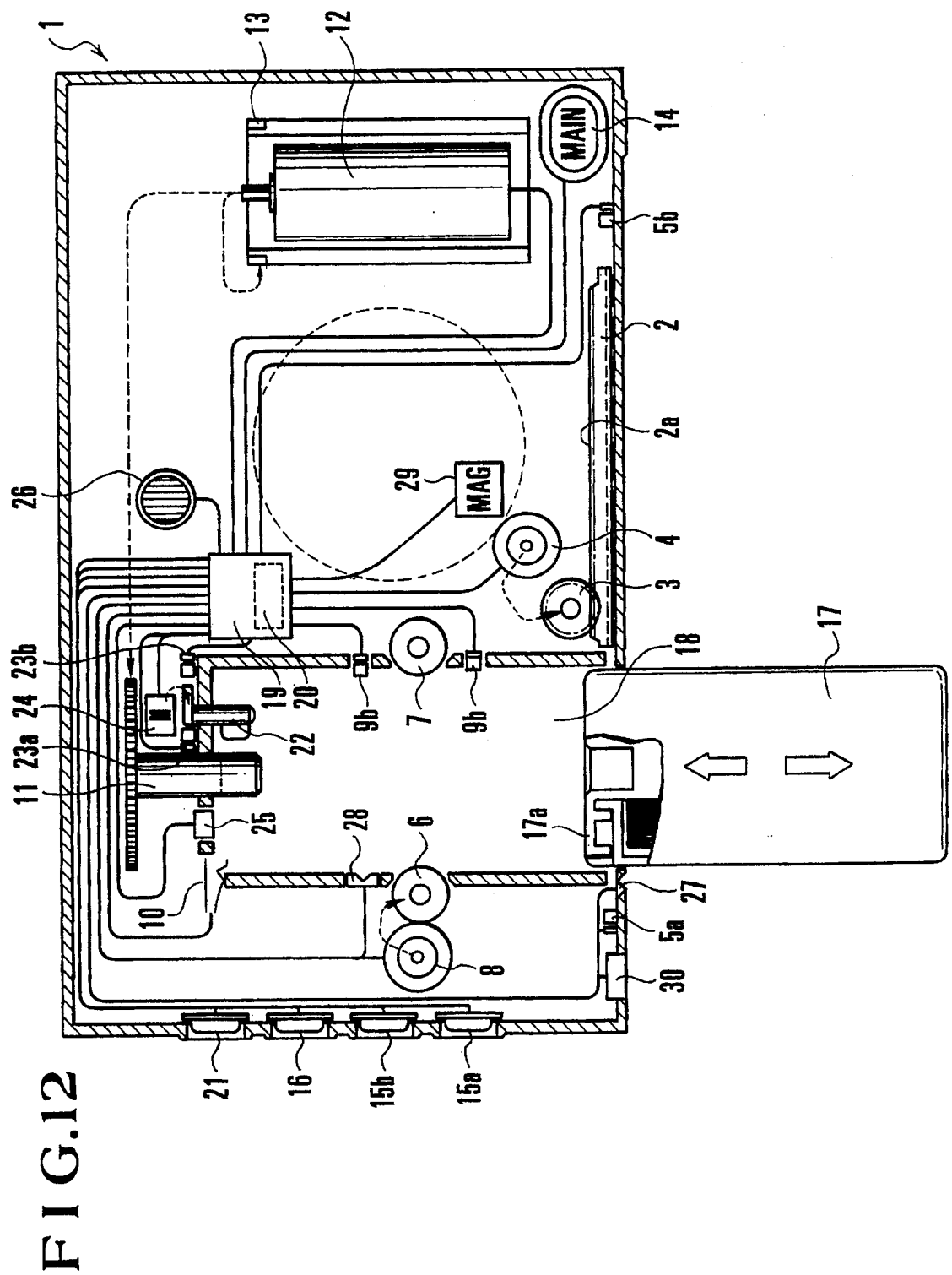
FIG. 12 is a cross sectional view which illustrates a camera according to a third embodiment of the present invention.

FIG. 12 is a diagram which illustrates the structure of a camera according to the third embodiment of the present invention. This embodiment differs from the first and second embodiments in that the arrangement according to the first and second embodiments that the detection of the state where the cartridge 17 is used is performed on the outside of the camera is replaced by the arrangement that the detection of the state where the cartridge 17 is used is performed on the wall of the cartridge chamber 18. In order to achieve this, this embodiment has a structure that the photoreflector 28 for detecting the state where the cartridge 17 is used according to the first and second embodiments is disposed on a wall 18 of the cartridge 17. Since other structures shown in FIG. 12 are the same as those shown in FIG. 1, the same structures that are the same as those shown in FIG. 1 are given the same reference numerals and their descriptions are omitted here.

Figure 13:
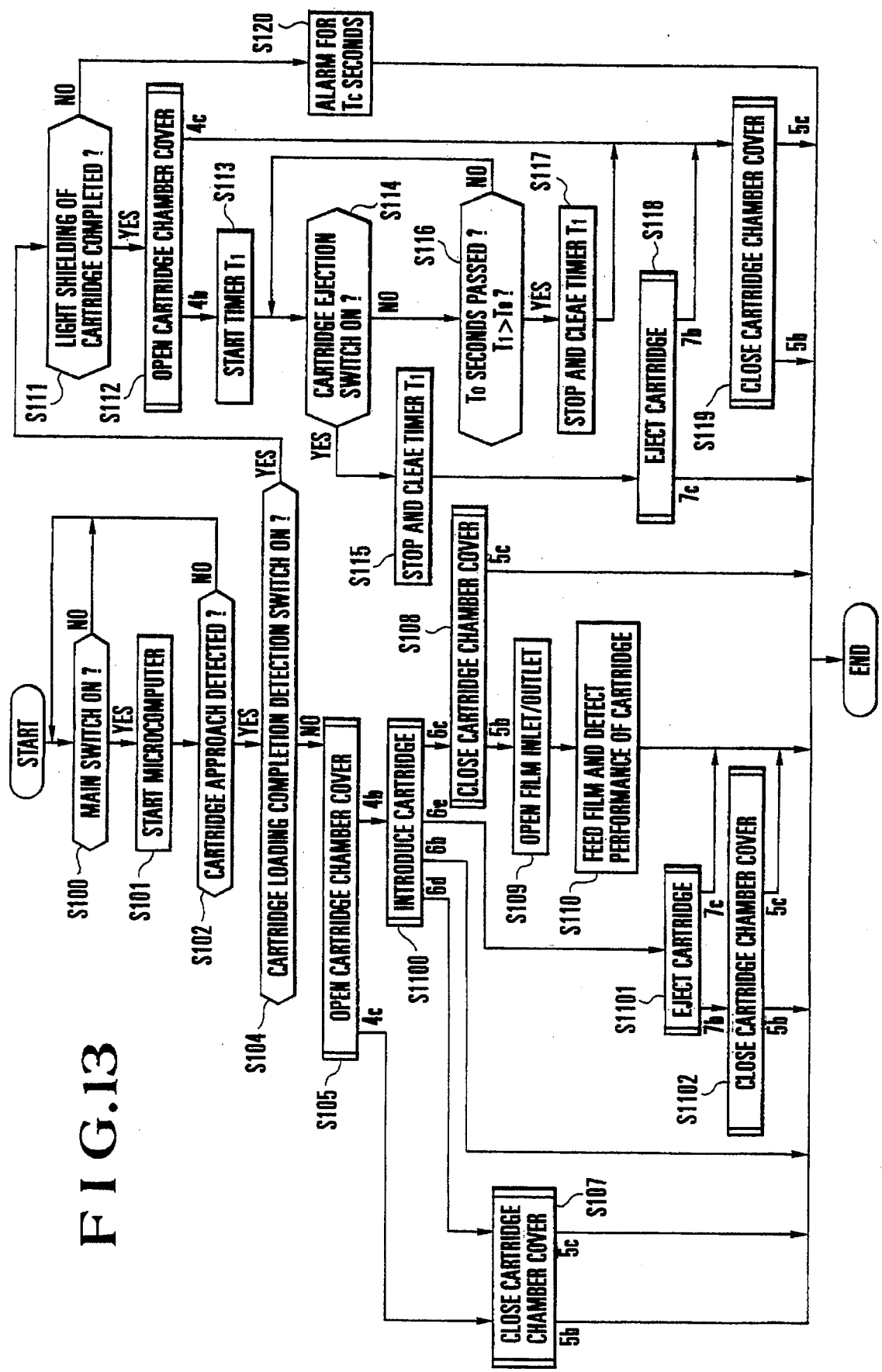
FIG. 13 is a flow chart showing a main sequence to be performed in the camera show in FIG. 12 for opening the cartridge chamber cover.
Figure 14:
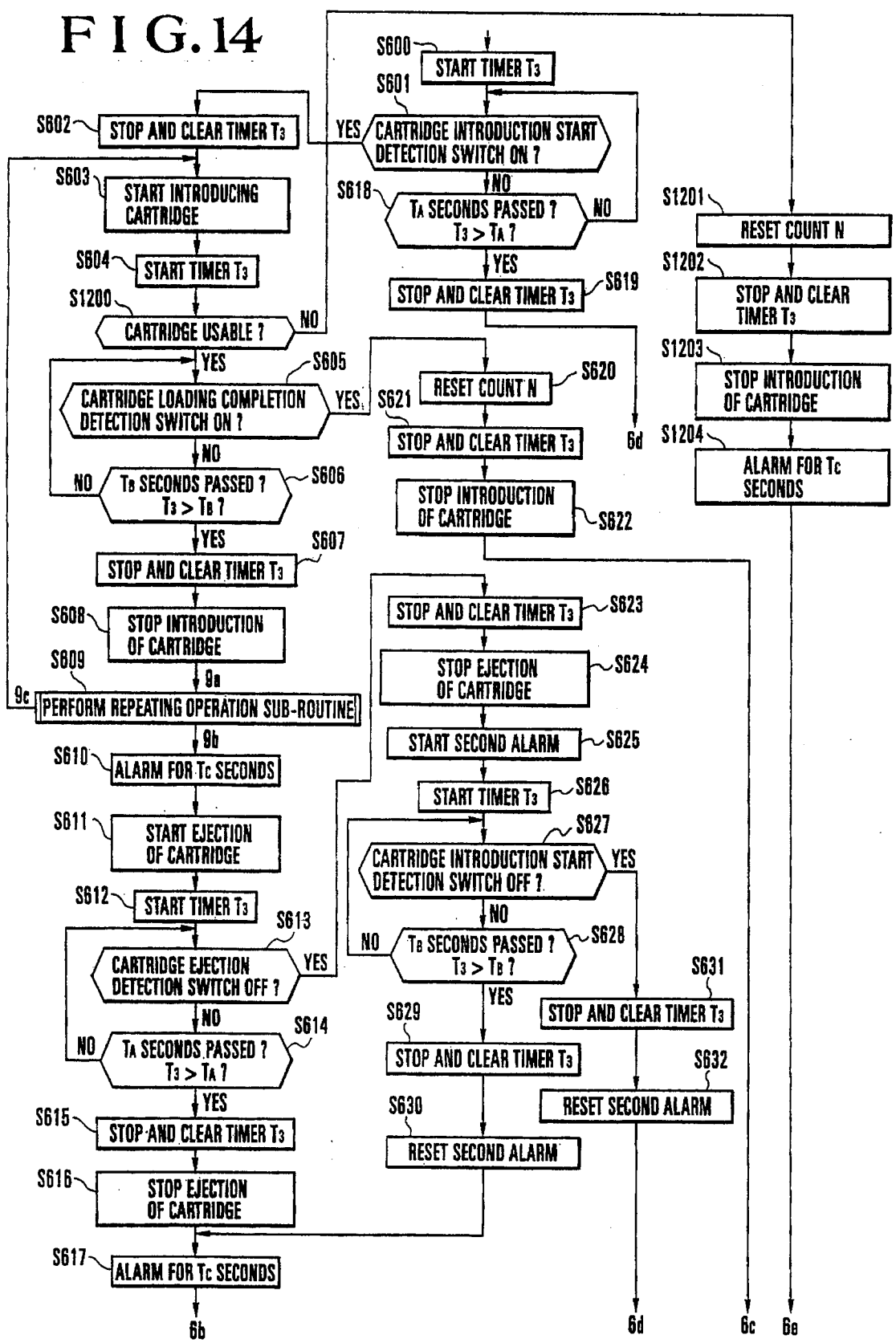
FIG. 14 is a flow chart showing a second sub-routine to be performed in the camera shown in FIG. 12 for introducing the cartridge.

Furthermore, since this embodiment has the same structure as that of the first embodiment except that the sequence according to the first embodiment and shown in FIG. 3 is partially replaced by a sequence shown in FIG. 13 and that a sub-routine shown in FIG. 14 is added, the descriptions of the same structures are omitted. As for the same structures, refer to FIGS. 2 and 4 to 10.

FIG. 13 is a flow chart showing a main sequence according to this embodiment to be performed when the cartridge chamber cover 2 is moved from the closed position to the opened position on the basis of detection of approach of the cartridge 17.

Referring to FIG. 13, the steps as those shown in FIG. 3 are given the same step numbers as those shown in FIG. 3 and their descriptions are omitted here.

Referring to FIG. 13, when the photosensor 27 of the cartridge information detection circuit 45 has detected the "approach of the cartridge 17", the operation proceeds to S104 regardless of the state where the cartridge 17 is used. In S104 completion of loading of the cartridge 17 is detected as to whether or not the cartridge 17 is present in the camera. Then, the operation proceeds to a next step.

If opening of the cartridge chamber cover 2 has been completed in S105 (4b), the operation proceeds to a cartridge introduction sub-routine to be described later so that introduction of the cartridge 17 into the cartridge chamber 18 is started (S1100). If the cartridge 17 has not been loaded in S104, leaving of the cartridge chamber cover 2 open is prevented such that the operation proceeds to a sub-routine for closing the cartridge chamber cover 2 (S107) so that closing of the cartridge chamber cover 2 is performed.

If the cartridge 17 has been loaded completely in S1100 (S1100: 6c), the operation proceeds to a cartridge chamber cover closing sub-routine (S108) so that closing of the cartridge chamber cover 2 is performed.

If the cartridge 17 has been loaded and as well as the introduction operation has been stopped halfway (S1100: 6b), the sequence shown in FIG. 3 is completed here. During the introduction of the cartridge 17, the photoreflector 28 of the cartridge information detection circuit 45 disposed on the wall of the cartridge chamber 18 in S1100 detects the state where the cartridge 17 is used. If the cartridge 17 can be used, the sequence shown in FIG. 13 is completed (S1100: 6e) and the sequence for ejecting the cartridge 17 shown in FIG. 9 is started (S1101). If the ejection operation has not been completed (S1101: 7c), the sequence shown in FIG. 13 is completed. If the ejection has been completed (S1101: 7b), the sub-routine for closing the cartridge chamber cover 2 shown in FIG. 7 is started (S1102). Then, the sequence shown in FIG. 13 is completed regardless of whether or not closing of the cartridge chamber cover 2 has been completed.

The sequence shown in FIG. 13 is able to prevent a problem in opening or closing the cartridge chamber cover 2 and in conveying the cartridge 17. Although the used cartridge 17 is once subjected to the introduction operation, the same is again ejected to prevent loading of the same into the camera. Therefore, the operation from a moment the cartridge chamber 18 is opened to a moment the same is closed can be performed automatically.

FIG. 14 shows a second sub-routine for introducing the cartridge 17 in S1100 shown in FIG. 13. The same steps as those shown in FIG. 8 are given the same reference numerals as those shown in FIG. 8 and their descriptions are omitted here.

Referring to FIG. 14, if the photoreflector 28 of the cartridge information detection circuit 45 has detected during introduction of the cartridge 17 that the cartridge 17 has been used (S1200: YES), the count N in the repeated operation sub-routine in S609 is reset (S1201), the timer $T_3$ is reset (S1202), the introduction of the cartridge 17 is stopped (S1203), the alarm circuit 40 gives an alarm to the user of the camera for Tc seconds with sound, display or light that the cartridge 17 has been used (S1204), and the operation is removed from the foregoing sub-routine (8d).

With the third embodiment of the present invention, if a used cartridge is intended to be loaded, the camera discriminates that the cartridge has been used, causing the cartridge to be ejected. Therefore, erroneous use of a used camera can be prevented.

A fourth embodiment of the present invention will now be described, the fourth embodiment being a modification of the third embodiment. The fourth embodiment is the same as the third embodiment except a main sequence in the flow chart shown in FIG. 15 for moving the cartridge chamber cover 2 from the closed position to the opened position on the basis of the detection of approach of the cartridge 17 and that the cartridge introduction sub-routine in a flow chart shown in FIG. 16, which are partially different from those shown in FIGS. 13 and 14.

Figure 15:
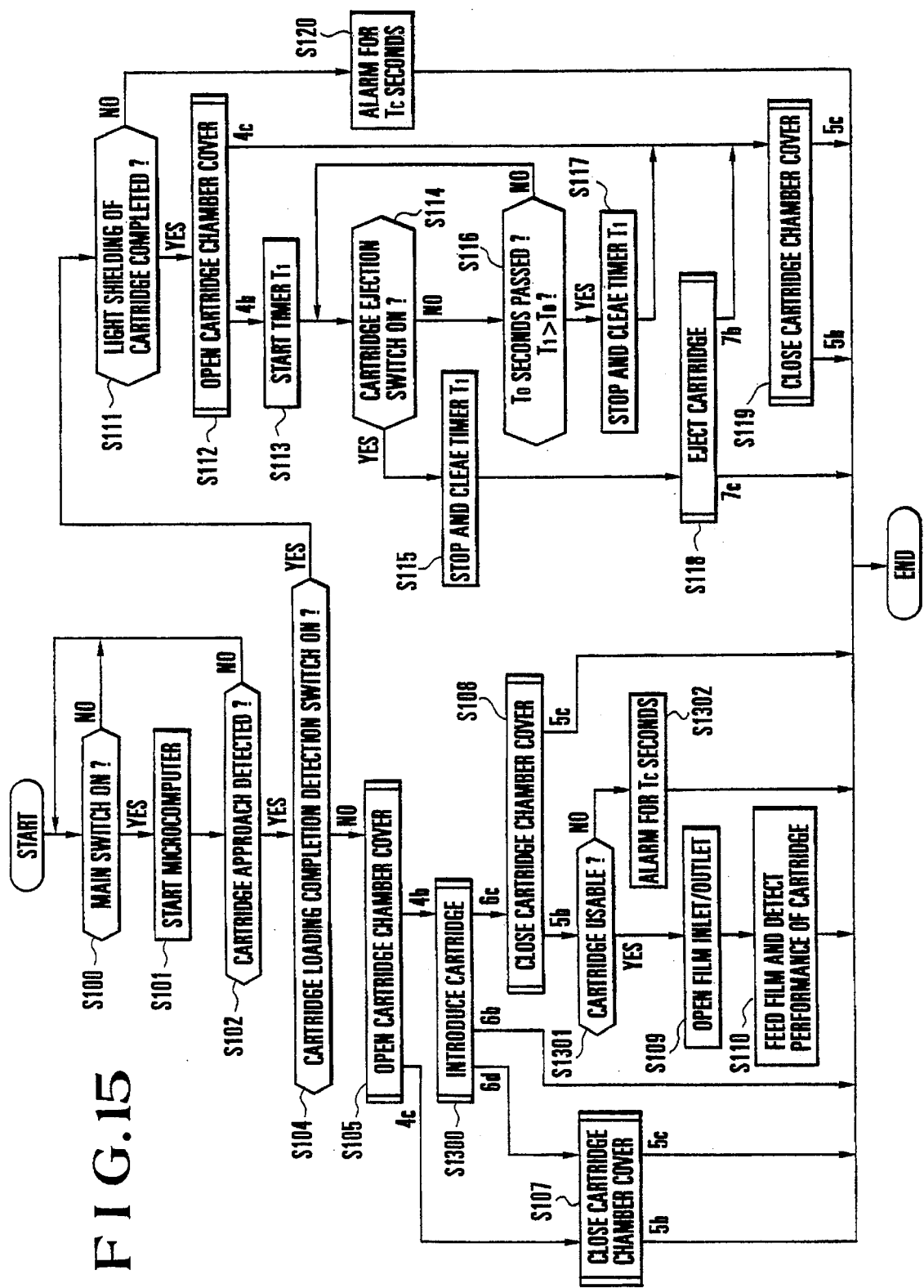
FIG. 15 is a flow chart showing a main sequence to be performed by a camera according to a fourth embodiment of the present invention for opening a cartridge chamber cover.

Referring to FIG. 15, the same steps as those shown in FIG. 13 are given the same step numbers and their descriptions are omitted here. Referring to FIG. 15, if opening of the cartridge chamber cover 2 has been completed (4b), the operation proceeds to a second sub-routine for introducing the cartridge 17 to be described later so that introduction of the cartridge 17 into the cartridge chamber 18 is started (S1300). If the cartridge 17 has not been loaded in S1100 (S1300: 6d), leaving of the cartridge chamber cover 2 open is prevented such that the operation proceeds to a sub-routine for closing the cartridge chamber cover 2 (S107) so that closing of the cartridge chamber cover 2 is performed.

If the cartridge 17 has been completely loaded in S1300 (S1300: 6c), the operation proceeds to a sub-routine for closing the cartridge chamber cover 2 (S108) so that closing of the cartridge chamber cover 2 is performed.

If the cartridge 17 has been loaded and as well as the introduction operation has been stopped halfway in S1300 (S1300: 6b), the sequence shown in FIG. 15 is completed.

During the introduction of the cartridge 17, the photoreflector 28 of the cartridge information detection circuit 45, in S1300, detects the state where the cartridge 17 is used. The result of the detection is stored in the microcomputer 19. If the cartridge 17 has been used in S1301 on the basis of the result of the detection (S1301: NO), the alarm circuit 40 gives an alarm to the user of the camera for Tc seconds with sound, display or light that the loaded cartridge 17 has been used (S1302). If the cartridge 17 has not been used (S1301: YES), the film inlet/outlet light shielding door of the cartridge 17 is opened (S109) to move the film to a position at which a picture can be taken (S110).

Figure 16:
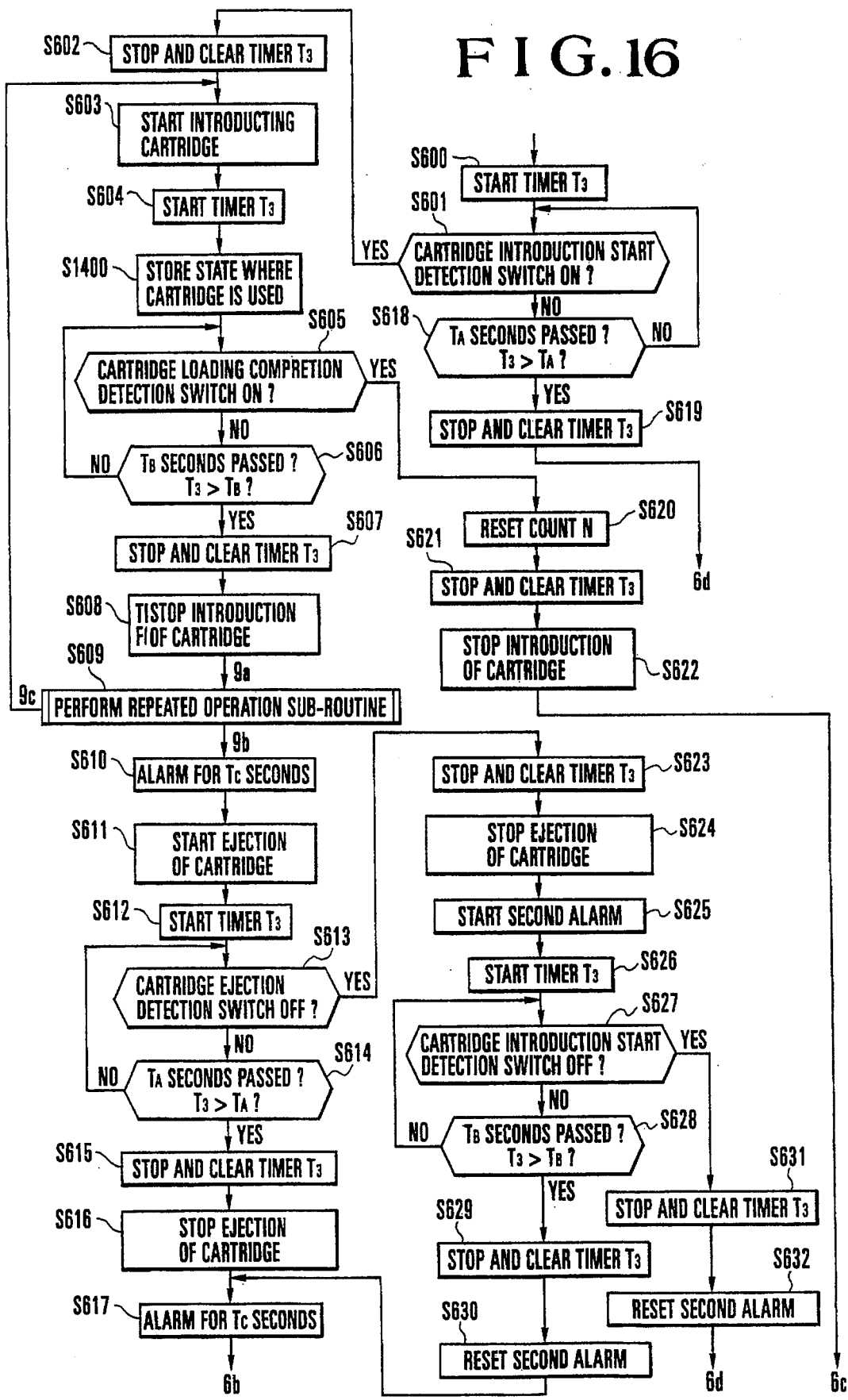
FIG. 16 is a flow chart showing a second sub-routine to be performed in the camera according to the fourth embodiment of the present invention for introducing the cartridge.

FIG. 16 shows a second sub-routine for introducing the cartridge 17 in S1100 shown in FIG. 15. Referring to FIG. 16, the same steps as those shown in FIG. 8 are given the same step numbers and their descriptions are omitted here. Referring to FIG. 16, the introduction of the cartridge 17 is started in S603. When the timer $T_3$ in the microcomputer 19 is started in S604, the photoreflector 28 of the cartridge information detection circuit 45, during the introduction operation, detects the state where the cartridge 17 is used. The result of the detection is stored in the memory in the microcomputer 19. The other structures are the same as those shown in FIG. 8.

According to the fourth embodiment of the present invention, if a used cartridge is intended to be loaded into the camera, a discrimination is made by the camera that the cartridge has been used so that the film inlet/outlet light shielding door is not opened and the film is not conveyed although the cartridge is completely loaded into the camera. Since loading of a used cartridge is alarmed to a user of the camera, portability of the used cartridge can be improved and an error of a type that a used cartridge is again subjected to photograph can be prevented.

A fifth embodiment of the present invention will now be described. The fifth embodiment differs from the foregoing embodiments in that detection of the "state where the cartridge is used" is performed by using the photoreflector 25 of the cartridge information detection circuit 45 disposed on the lower surface of the cartridge chamber 18.

As described above, the cartridge 17 according to this embodiment has a structure that the indication 17d appearing depending upon the position of the cut portion of the flange portion 17b shows the state where the cartridge 17 is used, as shown in FIG. 20 in detail. The photoreflector 25 is disposed to face the indication 17d of the loaded cartridge 17. If the loaded cartridge 17 can be used, the spool flange 17b is positioned to hide the indication 17d. Therefore, the photoreflector 25 receives light reflected by the flange portion 17b. As a result, whether or not the cartridge 17 can be used can be detected. If the cartridge 17 has been used, the cut portion of the spool flange 17b is brought to a position above the indication 7d. Therefore, the photoreflector 25 receives light reflected by the indication 7d or the cut portion of the flange portion 7b inhibits receipt of reflected light. Thus, the fact that the cartridge 17 cannot be used can be detected.

This embodiment is the same as the first embodiment except the main sequence for moving the cartridge chamber cover from the closed position to the opened position based on the detection of approach of the cartridge 17 according to the first embodiment and shown in FIG. 3.

Figure 17:
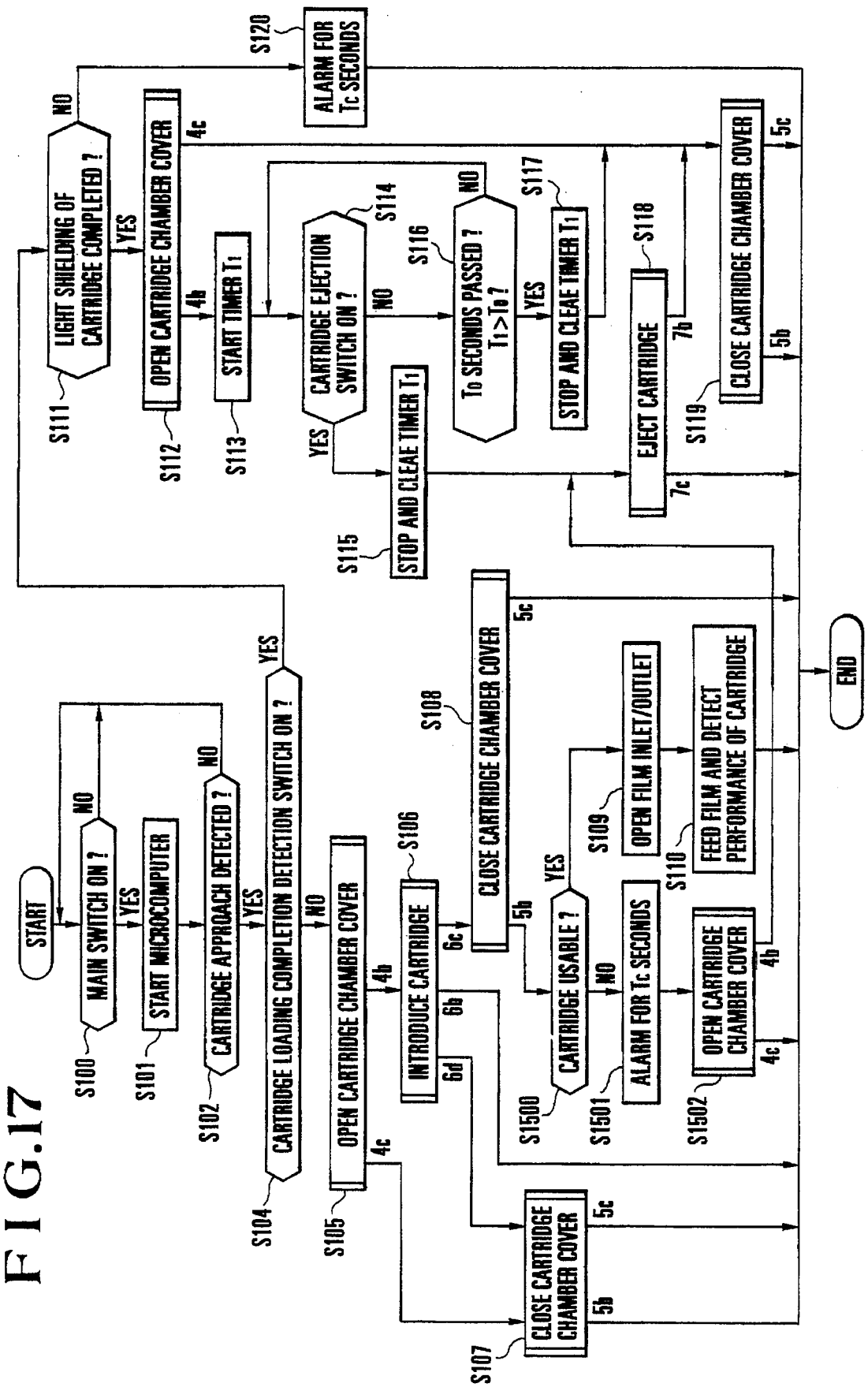
FIG. 17 is a flow chart showing a main sequence to be performed by a camera according to a fifth embodiment of the present invention for opening a cartridge chamber cover.

Referring to FIG. 17, the same steps as those shown in FIG. 3 are given the same step numbers as those shown in FIG. 3 and their descriptions are omitted here.

Referring to FIG. 17, when the photosensor 27 of the cartridge information detection circuit 45 has detected "approach of the cartridge 17" in S102, the operation proceeds to S104 regardless of the state where the cartridge 17 is used so that detection of completion of loading of the cartridge 17 is performed as to whether or not the cartridge 17 is present in the camera. Then, the operation proceeds to a next step.

When the cartridge chamber cover 2 has been opened, the cartridge 17 has been loaded completely and the cartridge chamber cover 2 has been closed (S108: 5b), the operation proceeds to S1500 so that the "state where the cartridge 17 is used" is detected by the photoreflector 25 of the cartridge information detection circuit 45. If the cartridge 17 can be used (S1500: YES), the film inlet/outlet light shielding door provided for the cartridge 17 is opened (S109) and the film is conveyed to a position at which a picture can be taken (S110). Then, the operation is removed from the foregoing sequence. If the cartridge 17 has been used (S1500: NO), the alarm circuit 40 gives an alarm to the user of the camera for Tc seconds with sound, display or light that the loaded cartridge 17 has been used (S1501). Then, the operation proceeds to a sub-routine for opening the cartridge chamber cover 2 shown in FIG. 6 so that the cartridge chamber cover 2 is opened (S1502). When the cartridge chamber cover 2 has been opened completely (S1502: 4b), the operation proceeds to a sub-routine in S118 for ejecting the cartridge 17 so that ejection of the cartridge 17 from the cartridge chamber 18 is performed. When the cartridge chamber cover 2 has been removed completely or when the ejection operation has been performed and this operation has resulted in incomplete ejection, the operation is performed along 7b of S118. In this case, the operation immediately proceeds to a sub-routine for closing the cartridge chamber cover 2. Thus, the cartridge chamber cover 2 is closed (S119) and the operation is removed from the foregoing sequence. In any of the sub-routines S118 and S119, the operation is removed from the sequence if the operation has been stopped halfway (S1502: 4C, S118: 7c and S119: 5c).

According to the fifth embodiment of the present invention, although the used cartridge is temporarily loaded into the camera, it is immediately ejected. Thus, an error of a type that the used cartridge is again subjected to photography can be prevented.

Since the detection of the "state where the cartridge is used" and the detection of the "performance of the cartridge" can be performed by the common reflector 25, the cost can be reduced and the space can be saved.

A sixth embodiment of the present invention will now be described. This embodiment has a structure that the steps ensuing S1501 of the fifth embodiment shown in FIG. 17 are omitted and that when an alarm is given in S1501 that the used cartridge has been loaded the sequence shown in FIG. 17 is completed. The other structures are the same as those of the fifth embodiment. In this embodiment, when a used cartridge has been loaded, the cartridge chamber cover 2 is closed to prevent ejection of the used cartridge 17.

According to this embodiment, when a used cartridge is loaded, it is completely introduced and loaded into the camera. However, the film is not conveyed and an alarm is given that the used cartridge has been loaded. Therefore, portability of the used cartridge can be improved and an error of a type that a used cartridge is again loaded and used can be prevented.

Since the detection of the "state where the cartridge is used" and detection of the "performance of the cartridge" can be performed by the common photoreflector 25, the cost can be reduced and the space can be saved.

A seventh embodiment of the present invention will now be described.

In this embodiment, the detection of the "state where the cartridge is used" is performed by the photoreflector 25 of the cartridge information detection circuit 45 similarly to the fifth and sixth embodiments. However, the "state where the cartridge is used" is not discriminated on the basis of the position of the cut portion of the flange portion 17b of the cartridge 17 as done in the fifth and sixth embodiments. As an alternative to this, the position of the bar code 17e on the surface of the flange portion 17b of the cartridge 17 showing the "performance of the cartridge" is detected by the photoreflector 25 so that the "state where the cartridge is used" is discriminated.

Figure 18:
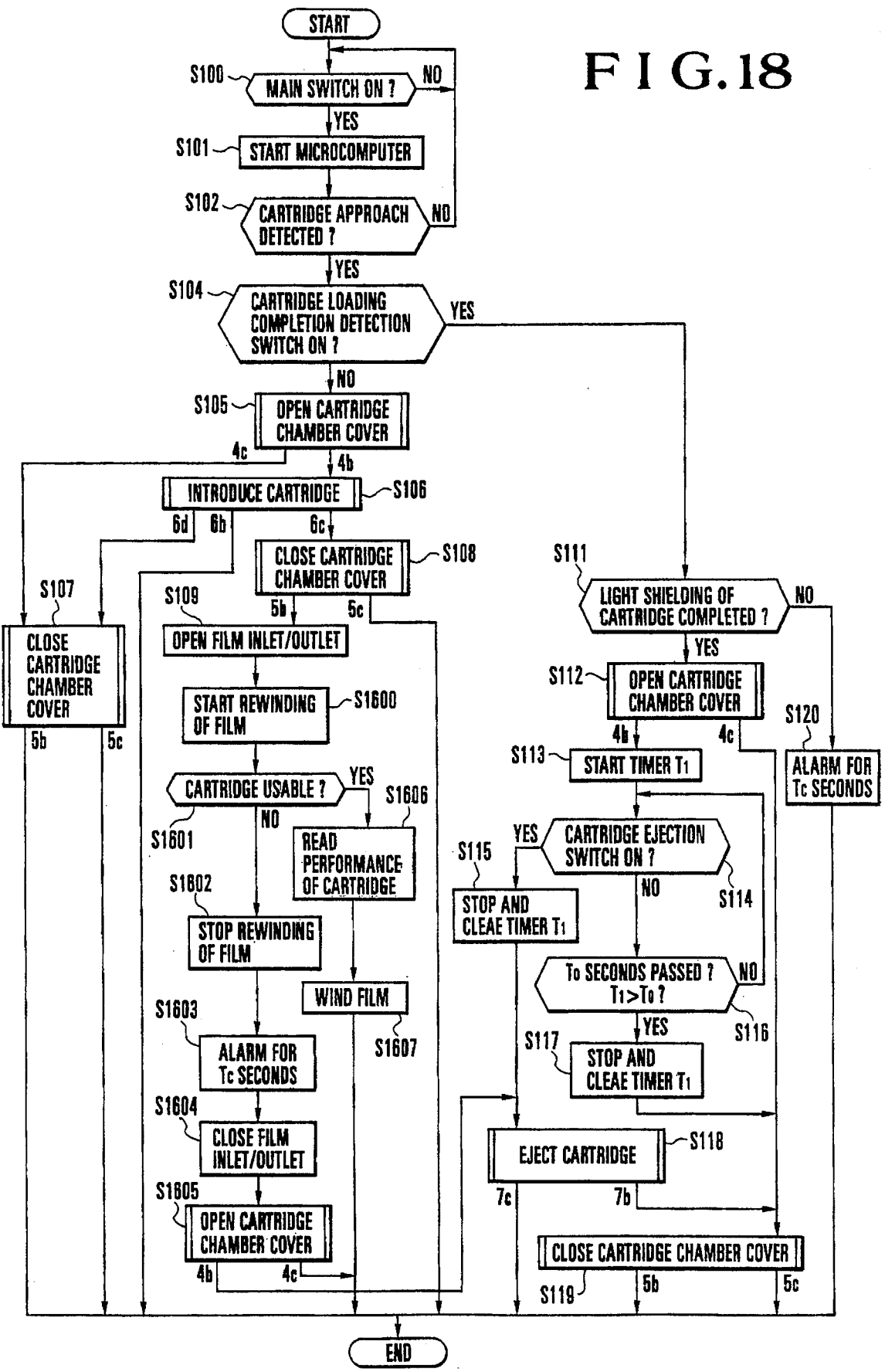
FIG. 18 is a flow chart showing a main sequence to be performed by a camera according to a seventh embodiment of the present invention for opening a cartridge chamber cover.

This embodiment has the same structure as that of the first embodiment except a main sequence, the flow chart of which is shown in FIG. 18, and which moves the cartridge chamber cover from the closed position to the opened position on the basis of the detection of approach of the cartridge, and which is different from that of the first embodiment shown in FIG. 3.

Referring to FIG. 18, the same steps as those shown in FIG. 3 are given the same step numbers as those shown in FIG. 3 and their descriptions are omitted here.

Referring to FIG. 18, when the photosensor 27 of the cartridge information detection circuit 45 has detected "approach of the cartridge" in S102, the operation proceeds to S104 regardless of the state where the cartridge is used so that detection of completion of loading of the cartridge is performed such that the cartridge is present in the camera. Then, the operation proceeds to a next step.

When the film inlet/outlet light shielding door of the cartridge 17 is then opened in S109, the film feeding circuit 33 operates the cartridge 17 in the rewinding direction (S1600). As a result, the position of the bar code 17e provided on the surface of the flange portion 17b of the cartridge 17 is detected by the photoreflector 25 of the cartridge information detection circuit 45 to discriminate the "state where the cartridge is used" (S1601). If the loaded cartridge is not a used cartridge (S1601: YES), the photoreflector 25 reads information of the "state where the cartridge is used" from the bar code 17e (S1606). Then, the film feeding circuit 33 switches the operation of the cartridge 17 from the film rewinding direction to the film winding direction to convey the film to the position at which a picture can be taken (S1607) and the sequence shown in FIG. 18 is completed.

If the loaded cartridge is a used cartridge 17 (S1601: NO), the film feeding circuit 33 stops the operation of the cartridge 17 in the film rewinding direction (S1602) and the alarm circuit 40 gives an alarm to the user of the camera for Tc seconds with sound, display or light that the loaded cartridge 17 is a used cartridge (S1603). Then, the film feeding circuit 33 closes the film inlet/outlet light shielding door of the cartridge 17 (S1604) so that the cartridge 17 is brought to a completely light shielded state. Then, the operation proceeds to a sub-routine for opening the cartridge chamber cover 2 shown in FIG. 6 so that the cartridge chamber cover 2 is opened (S1605). When the cartridge chamber cover 2 has been completely opened (S1605: 4b), the operation proceeds to a sub-routine for ejecting the cartridge 17 shown in FIG. 9 so that the used cartridge 17 is ejected from the cartridge chamber 18 (S1606). In only a case where the cartridge has been completely removed or in a case where the same has not been removed but it is left in the cartridge chamber 18 (S1606: 7b), the operation proceeds to a sub-routine for closing the cartridge chamber cover 2 shown in FIG. 7 so that the cartridge chamber cover 2 is closed (S1607). If the cartridge chamber cover 2 has been completely closed, the operation proceeds along 5b from 1607. In any of the sub-routines in S1605, S1606 and S1607, if the operation has been stopped halfway (S1605: 4c, S1606: 7c and S1607: 5c), the operation is stopped and the sequence shown in FIG. 18 is completed.

According to the seventh embodiment of the present invention, a used cartridge is temporarily loaded into the camera. However, it is immediately ejected and, thus, an error of a type that a used cartridge is used again can be prevented.

Since the detection of the "state where the cartridge is used" and the detection of the "performance of the cartridge" can be performed by the common photoreflector, the cost can be reduced and the space can be saved.

An eighth embodiment of the present invention will now be described. This embodiment has a structure that the steps ensuing S1603 in the sequence according to the seventh embodiment shown in FIG. 18 are omitted and when loading of a used cartridge has been alarmed in S1603 the sequence shown in FIG. 18 is completed. The other structures are the same as those of the seventh embodiment. This embodiment has a structure that when a used cartridge has been loaded into the camera the cartridge chamber cover 2 is closed to prevent ejection of the used cartridge 17.

According to this embodiment, if a used cartridge is intended to be loaded, it is completely introduced into the camera and loaded into the camera. Then, the film inlet/outlet light shielding door is not opened and an alarm is given that a used cartridge has been loaded. Therefore, the portability of the used cartridge can be improved and an error of a type that a used cartridge is again used can be prevented.

Since the detection of the "state where the cartridge is used" and detection of the "performance of the cartridge" can be performed by the common photoreflector 25, the cost can be reduced and the space can be saved.

A ninth embodiment will now be described in which the detection of the "state where the cartridge is used" is performed in the camera but not inside of the cartridge chamber.

In this embodiment, a detection means for detecting the "state where the cartridge is used" has a structure that the "state where the cartridge is used" is written on a place other than the surface of the cartridge, for example, on a magnetic layer of a film. Thus, the state is, together with the "performance of the cartridge", read by the magnetic head 29 shown in FIG. 1. This embodiment is the same as the first embodiment except the main sequence, the flow chart of which is shown in FIG. 19, which moves the cartridge chamber cover 2 from the closed position to the opened position on the basis of detection of approach of the cartridge, and which is different from that according to the first embodiment shown in FIG. 3.

Figure 19:
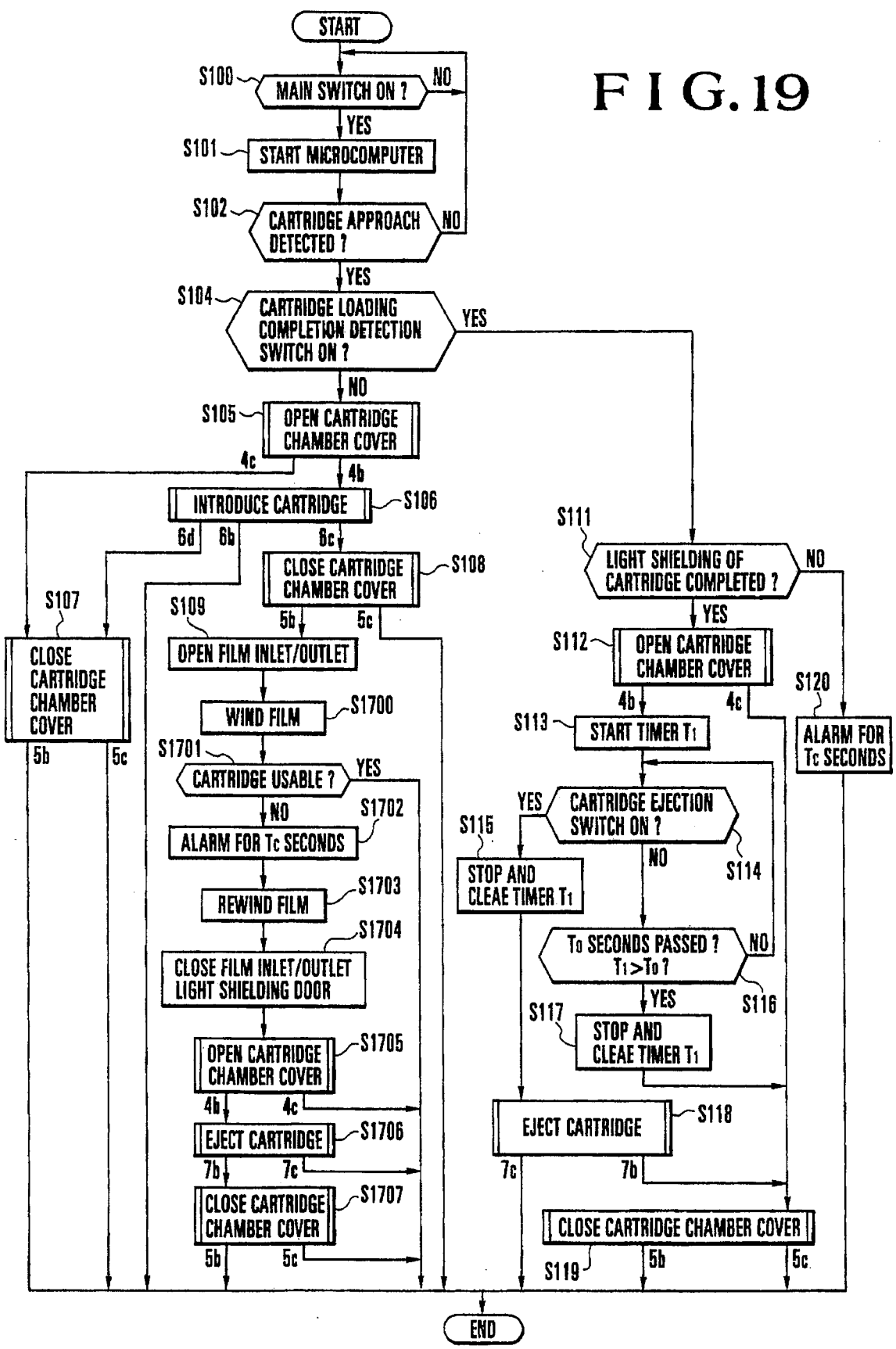
FIG. 19 is a flow chart showing a main sequence to be performed by a camera according to a ninth embodiment of the present invention for opening a cartridge chamber cover.

Referring to FIG. 19, the same steps as those shown in FIG. 3 are given the same step numbers and their descriptions are omitted here.

Referring to FIG. 19, when the photosensor 27 of the cartridge information detection circuit 45 has detected "approach of the cartridge" in S102, the operation proceeds to S104 regardless of the state where the cartridge 17 is used so that detection of completion of loading of a cartridge is performed such that whether or not a cartridge is present in the camera. Then, the operation proceeds to a next step.

When the film inlet/outlet light shielding door of the cartridge 17 has been then opened in S109, the film feeding circuit 33 conveys the film in the cartridge 17 to a position at which a picture can be taken (S1700). During this, the head drive circuit 46 causes the magnetic head 29 to read data from the magnetic layer provided for the film (S1701). On the basis of data read from the magnetic layer, whether or not the loaded cartridge 17 has been used is discriminated. If the loaded cartridge 17 is not a used cartridge, the operation is removed from the foregoing sequence. If the loaded cartridge 17 is a used cartridge, the alarm circuit 40 gives an alarm to the user of the camera for Tc seconds with sound, display or light that the loaded cartridge 17 is a used cartridge (S1702). Then, the film feeding circuit 33 again rewinds the film into the cartridge 17 (S1703). After the film has been completely rewound into the cartridge 17, the film feeding circuit 33 closes the film inlet/outlet light shielding door (S1704) so that the cartridge 17 is completed light-shielded. Then, the operation proceeds to a sub-routine for opening the cartridge chamber cover 2 shown in FIG. 6 so that the cartridge chamber cover 2 is opened (S1705). When the cartridge chamber cover 2 has been completely opened (S1705: 4b), the operation proceeds to a sub-routine for ejecting the cartridge 17 shown in FIG. 9 so that the used cartridge 17 is ejected from the cartridge chamber 18 (S1706). If the cartridge 17 has been completely removed or if the same has not been removed and as well as the same is loaded in the cartridge chamber 18 (S1706: 7b), the operation proceeds to the sub-routine for closing the cartridge chamber cover 2 shown in FIG. 7 so that the cartridge chamber cover 2 is closed (S1707). If the cartridge chamber cover 2 has been completely closed, the operation proceeds along 5b from S1707. In any of the sub-routines S1705, S1706 and S1707, if the operation has been stopped halfway (S1705: 4c, S1706: 7c and S1707: 5c), the operation is stopped and the sequence shown in FIG. 19 is completed.

According to the ninth embodiment of the present invention, although a used cartridge is temporarily loaded and the film is fed, the film is immediately rewound into the cartridge and the cartridge is ejected from the cartridge chamber. Therefore, an error of a type that a used cartridge is again used can be prevented.

Since the detection of the "state where the cartridge is used" and detection of the "performance of the cartridge" can be performed by the common magnetic head 29, the cost can be reduced and the space can be saved.

A tenth embodiment of the present invention will now be described. This embodiment has a structure that steps ensuing from S1704 in the sequence of the ninth embodiment shown in FIG. 19 are omitted and, when the film inlet/outlet light shielding door of the cartridge 17 has been closed in S1704 the sequence shown in FIG. 19 is completed. The other structures are the same as those of the ninth embodiment. In this embodiment, if a used cartridge has been loaded, the state where the cartridge chamber cover 2 is closed is maintained, the wound film is rewound and the film inlet/outlet light shielding door is closed.

According to this embodiment, if a used cartridge is intended to be loaded, the film is temporarily wound. However, the film is rewound and the same is maintained in a light-shield state by closing the cartridge chamber cover 2. Therefore, excellent portability of a used cartridge can be realized and an error of a type that a used cartridge is again used can be prevented. Furthermore, when the cartridge chamber cover 2 is opened, it can be opened immediately because the cartridge 17 has been shielded from light.

Since the detection of the "state where the cartridge is used" and detection of the "performance of the cartridge" can be performed by the common magnetic head 29, the cost can be reduced and the space can be saved.

Methods of detecting cartridge information, such as "approach of the cartridge", "the state where the cartridge is used" and the "performance of the cartridge" are not limited to those according to the foregoing embodiments. The methods may be any of mechanical, optical and magnetical methods correspondently to the shape of the cartridge and to meet the desire.

Reading of bar code information on the end surface of the cartridge according to the foregoing embodiments may be performed during winding of the film or rewinding of the same or in a state where the conveyance of the film is stopped.

Although the flow chart according to each of the embodiments has the arrangement that the cartridge chamber cover 2 is opened when "approach of the cartridge" has been detected, the cartridge chamber cover 2 can, of course, be opened by depressing the cartridge chamber cover opening switch 15a. In this case, the sequence is arranged such that the step for detecting the "approach of the cartridge" is a step for detecting switching of the cartridge chamber cover opening switch 15a.

The "alarm" according to each embodiment may be formed into an individual form to indicate the content of the "alarm".

The time to be measured by the timer according to each embodiment may be set to a desired time.

Although each embodiment has the arrangement that whether or not the film can be used is discriminated in accordance with a degree of a state where the cartridge can be used, the discrimination may be performed in accordance with another degree of a state where said cartridge can be used as well as whether or not the film has been used.

The present invention is not limited to a structure in which the cartridge is loaded from a position below the camera as done in each embodiment. For example, the present invention can be applied to a structure in which the cartridge is loaded from an upper position or a side position.

The present invention is not limited to the structure in which the cartridge is loaded in the axial direction thereof as employed in each embodiment.

The present invention can be applied to a cartridge having a moveable light shielding door or the like having a different shape of that according to each of the foregoing embodiments.

The present invention can be applied to another image recording medium as well as the film.

Furthermore, the present invention can be applied to another type of cartridge as well as the cartridge according to each embodiment, such as a cartridge having another shape, a cartridge having an image recording medium other than film, a cartridge of a different type, and a unit to be loaded other than a cartridge, such as a battery.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The present invention may be constituted by combining the foregoing embodiments or their technical elements as desired.

The present invention may be constituted such that the overall body or a part of the claim or the structure of the embodiment constitute one unit, the same may be combined with another unit or the same may be an element constituting a unit.

Furthermore, the present invention can be applied to any of a variety of cameras, such as a single lens reflex camera, a lens shutter camera and a video camera. In addition, the present invention can be applied to an optical unit other than a camera, another unit, a unit applied to the camera, an optical unit and the other unit, an element constituting the foregoing unit.

What is claimed is:

1. An apparatus adapted to an image recording medium cartridge, said apparatus comprising:

(A) an operation device which automatically performs at least one of loading the cartridge to a cartridge chamber and unloading said cartridge from the cartridge chamber, said operation device which automatically performs at least one of opening and closing a cover of the cartridge chamber; and (B) a changing device which changes an operation of said operation device in accordance with a state where said cartridge has been used.

2. An apparatus adapted to a film cartridge, comprising:

(A) an operation device which automatically performs at least one of loading the cartridge to and unloading said cartridge from a cartridge chamber, said operation device which automatically performs at least one of opening and closing a cover of the cartridge chamber; and (B) a changing device which changes an operation of said operation device in accordance with a state where said cartridge has been used.

3. An apparatus adapted to an image recording medium cartridge having an operable light shield portion, said apparatus comprising:

(A) an operation device which automatically performs at least one of loading the cartridge to and unloading said cartridge from a cartridge chamber, said operation device which automatically performs at least one of opening and closing a cover of the cartridge chamber; and (B) a changing device which changes an operation of said operation device in accordance with a state where said cartridge has been used.

4. An apparatus according to any one of claims 1, 2 and 3, wherein said operation device includes means for performing at least one of introducing said cartridge to said apparatus and ejecting said cartridge from said apparatus.

5. An apparatus according to any one of claims 1 and 2, wherein said operation device includes means for actuating said cover of said cartridge.

6. An apparatus according to any one of claims 1, 2 and 3, wherein said operation device includes an electric drive unit.

7. An apparatus according to any one of claims 1, 2 and 3, wherein said operation device includes a motor.

8. An apparatus according to any one of claims 1, 2 and 3, further comprising means for notifying a user of the state where said cartridge has been used.

9. An apparatus according to any one of claims 1, 2 and 3, wherein said changing device includes means for determining the state where said cartridge has been used, prior to loading of said cartridge to said apparatus.

10. An apparatus according to any one of claims 1, 2 and 3, wherein said changing device includes means for determining the state where said cartridge has been used, during loading of said cartridge to said apparatus.

11. An apparatus according to any one of claims 1, 2 and 3, wherein said second means includes means for determining the state where said cartridge has been used, after said cartridge has been loaded to said apparatus.

12. An apparatus according to any one of claims 1, 2 and 3, wherein said changing device includes means for determining the state where said cartridge has been used in accordance with a position of a spool of said cartridge.

13. An apparatus according to any one of claims 1, 2 and 3, wherein said changing device includes means for determining the state where said cartridge has been used in accordance with a bar code provided for said cartridge.

14. An apparatus according to any one of claims 1, 2 and 3, wherein said changing device includes means for determining the state where said cartridge has been used in accordance with information stored in a memory portion of said image recording medium loaded.

15. An apparatus according to claim 3, wherein said operation device includes means for actuating said operable light shield portion.

16. An apparatus according to claim 2, wherein said operation device includes means for actuating a cover of said cartridge.

17. An apparatus according to any one of claims 1, 2, and 3, wherein said apparatus includes a camera.

18. An apparatus according to any one of claims 1, 2, and 3, wherein said apparatus includes an optical apparatus.

19. An apparatus according to any one of claims 1, 2, and 3, wherein said apparatus includes a device which is adapted to a camera.

20. An apparatus according to any one of claims 1, 2, and 3, wherein said apparatus includes a device which is adapted to an optical apparatus.

21. An apparatus according to any one of claims 1, 2 and 3, wherein said operation device comprises a moving device which moves the cartridge so as to perform said at least one of loading and unloading the cartridge.

* * * * *

UNITED STATES PATENT AND TRADEMARK OFFICE
CERTIFICATE OF CORRECTION

PATENT NO. : 5,612,760
DATED : March 18, 1997
INVENTOR(S) : Okuno, Ryoji

It is certified that error appears in the above-identified patent and that said Letters Patent is hereby corrected as shown below:

Col. 3, line 3, delete "Gear" and insert -- gear --.

Col. 5, line 6, delete "Gear" and insert -- gear --.

Col. 7, line 5, after "photoreflector" insert -- 28 --.

Col. 12, line 33, delete "$T_3$" and insert -- $T_B$ --.

Col. 26, line 2, delete "second means" and insert -- changing device --.

Signed and Sealed this

Fourteenth Day of July, 1998

Attest:

BRUCE LEHMAN

Attesting Officer

Commissioner of Patents and Trademarks